(12) United States Patent
Kondo

(10) Patent No.: US 12,544,798 B2
(45) Date of Patent: Feb. 10, 2026

(54) FOREIGN MATERIAL REMOVAL SYSTEM

(71) Applicant: FUJI CORPORATION, Chiryu (JP)

(72) Inventor: Hironori Kondo, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 30 days.

(21) Appl. No.: 18/695,881

(22) PCT Filed: Oct. 7, 2021

(86) PCT No.: PCT/JP2021/037110
§ 371 (c)(1),
(2) Date: Mar. 27, 2024

(87) PCT Pub. No.: WO2023/058183
PCT Pub. Date: Apr. 13, 2023

(65) Prior Publication Data
US 2025/0128294 A1    Apr. 24, 2025

(51) Int. Cl.
*B07C 5/342*    (2006.01)
*B07C 5/36*    (2006.01)

(52) U.S. Cl.
CPC ............. *B07C 5/342* (2013.01); *B07C 5/36* (2013.01); *B07C 2501/0054* (2013.01); *B07C 2501/0063* (2013.01)

(58) Field of Classification Search
CPC . B07C 5/342; B07C 5/361; B07C 2501/0054; B07C 2501/0063
USPC .............................. 209/522, 552; 414/226.01
See application file for complete search history.

(56) References Cited

U.S. PATENT DOCUMENTS 7,313,464 B1 * 12/2007 Perreault ............... B25J 9/1666
                                                            700/262
9,415,511 B2    8/2016 Gotou
2015/0127162 A1    5/2015 Gotou
(Continued)

FOREIGN PATENT DOCUMENTS

JP    10-180667 A    7/1998
JP    2000-042499 A    2/2000
JP    2001-239484 A    9/2001
(Continued)

OTHER PUBLICATIONS

International Search Report issued Dec. 7, 2021 in PCT/JP2021/037110, filed on Oct. 7, 2021, 2 pages.

*Primary Examiner* — Molly K Devine
(74) *Attorney, Agent, or Firm* — Oblon, McClelland, Maier & Neustadt, L.L.P.

(57) ABSTRACT

A foreign material removal system includes a conveyance device to convey a waste material, in which a target object and a foreign material are mixed, in a conveyance direction, a foreign material detection device to detect the foreign material, and a foreign material removal device to pick up the foreign material, carry the foreign material to a predetermined disposal place, and discard the foreign material. In the foreign material removal system, the foreign material removal device determines a possibility of pickup of the foreign material based on at least one of a feature or a surrounding situation of the foreign material detected by the foreign material detection device, and determines whether to pick up the foreign material or determines a priority of picking up the foreign material, based on the possibility of pickup.

9 Claims, 16 Drawing Sheets

(56) References Cited

U.S. PATENT DOCUMENTS

2021/0122586 A1   4/2021  Sun et al.

FOREIGN PATENT DOCUMENTS

| JP | 2015-089589 A  |  5/2015 |
| JP | 2021-110573 A  |  8/2021 |
| SE |    1830136 A1  | 11/2019 |

* cited by examiner

FOREIGN MATERIAL REMOVAL SYSTEM

TECHNICAL FIELD

The present disclosure relates to a foreign material removal system.

BACKGROUND ART

Conventionally, a robot system in which a robot takes out a specific object from waste conveyed by a belt conveyor is known. For example, Patent Literature 1 discloses a robot system in which a control controller causes a gripping hand of a robot to take out a specific object selected by an operator from waste.

PATENT LITERATURE

Patent Literature 1: JP-A-H10-180667

BRIEF SUMMARY

Technical Problem

However, in the robot system of Patent Literature 1, in a case where it is difficult to take out the specific object from the waste material, the robot hand is likely to fail to take out the specific object. In addition, in a case where two or more specific objects are located close to each other, another specific object is likely to be conveyed downstream while the gripping hand takes out one specific object from the waste. As described above, the robot system disclosed in Patent Literature 1 cannot efficiently take out the specific object from the waste.

The present disclosure has been made to solve the above-described problem, and a main object thereof is to efficiently remove a foreign material from a waste material.

Solution to Problem

A foreign material removal system of a first aspect of the present disclosure is a foreign material removal system including a conveyance device configured to convey a waste material in a conveyance direction, a target object and a foreign material being mixed in the waste material, a foreign material detection device configured to detect the foreign material contained in the waste material, and a foreign material removal device provided downstream of the foreign material detection device in the conveyance direction, and configured to pick up the foreign material detected by the foreign material detection device, carry the foreign material to a predetermined disposal place, and discard the foreign material, in which the foreign material removal device is configured to determine a possibility of pickup of the foreign material based on at least one of a feature or a surrounding situation of the foreign material detected by the foreign material detection device, and determine whether to pick up the foreign material or determine a priority of picking up the foreign material, based on the possibility of pickup.

In the foreign material removal system of the first aspect, the foreign material removal device determines a possibility of pickup of the foreign material based on at least one of a feature or a surrounding situation of the foreign material detected by the foreign material detection device, and determines whether to pick up the foreign material or determines a priority of picking up the foreign material, based on the possibility of pickup. Accordingly, since the foreign material removal device can pick up the foreign material having a high possibility of pickup, and prevent the foreign material having a low possibility from being picked up, the probability of successfully picking up the foreign material increases. In addition, since the foreign material removal device can pick up foreign materials in descending order of priority, in other words, foreign materials in descending order of possibility of pickup, the probability of successfully picking up foreign materials increases. Accordingly, the foreign material can be efficiently removed. The features of the foreign material include, for example, the size and shape of the foreign material.

A foreign material removal system of a second aspect of the present disclosure is a foreign material removal system including a conveyance device configured to convey a waste material in a conveyance direction, a target object and a foreign material being mixed in the waste material, a foreign material detection device configured to detect the foreign material contained in the waste material, and a foreign material removal device provided downstream of the foreign material detection device in the conveyance direction, and configured to pick up the foreign material detected by the foreign material detection device, carry the foreign material to a predetermined disposal place, and discard the foreign material, in which the foreign material removal device is configured to collectively pick up two or more foreign material pieces, carries the foreign material pieces to the disposal place, and discards the foreign material pieces.

In the foreign material removal system of the second aspect, the foreign material removal device collectively picks up two or more foreign material pieces, carries the foreign material pieces to the disposal place, and discards the foreign material pieces. In this manner, the foreign material pieces can be efficiently removed as compared with the case where the foreign material pieces are picked up one by one, carried to the disposal place, and discarded.

DESCRIPTION OF EMBODIMENTS

Figure 1:
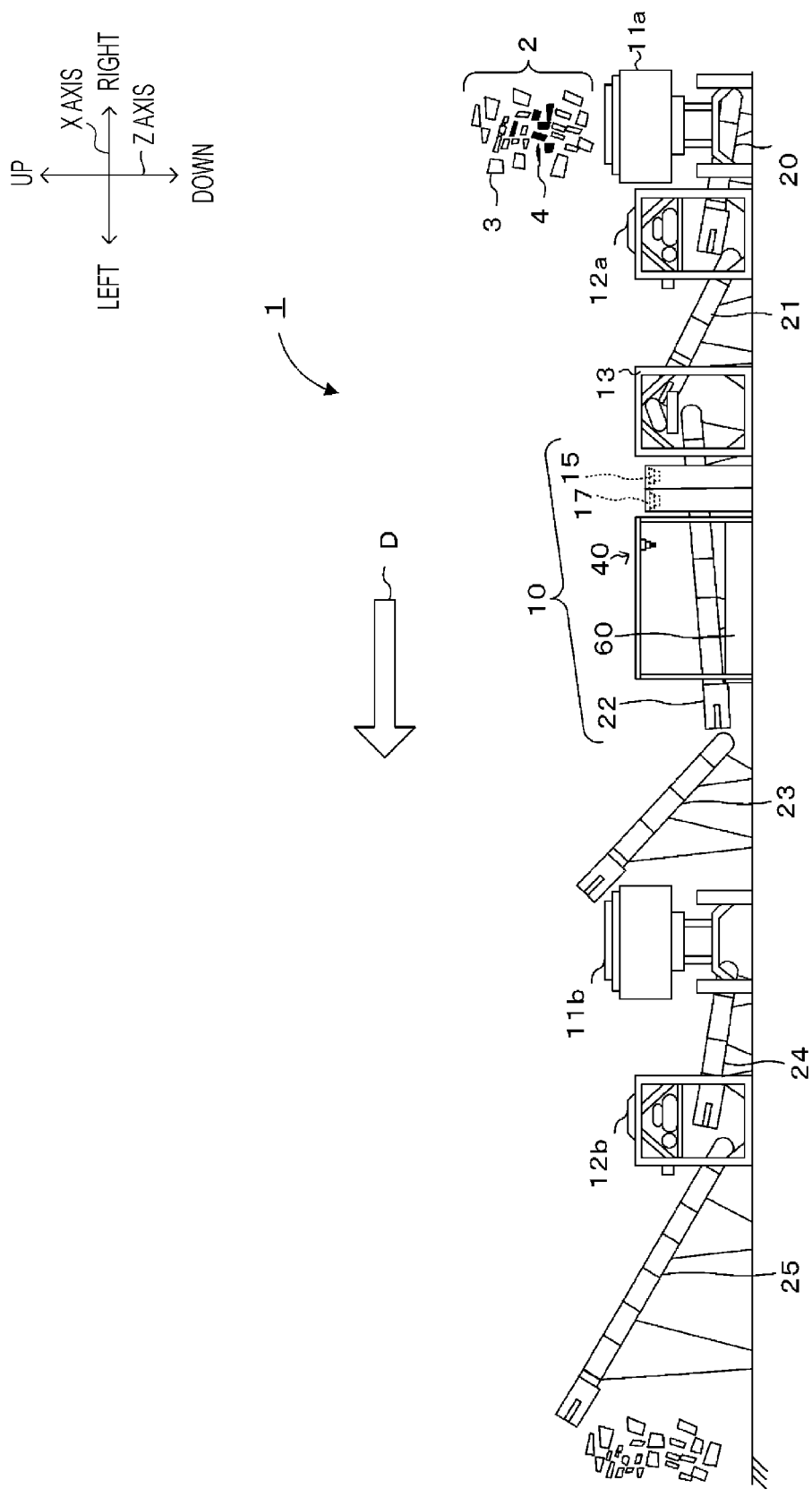
FIG. 1 is a diagram illustrating a configuration of recycling system 1.
Figure 2:
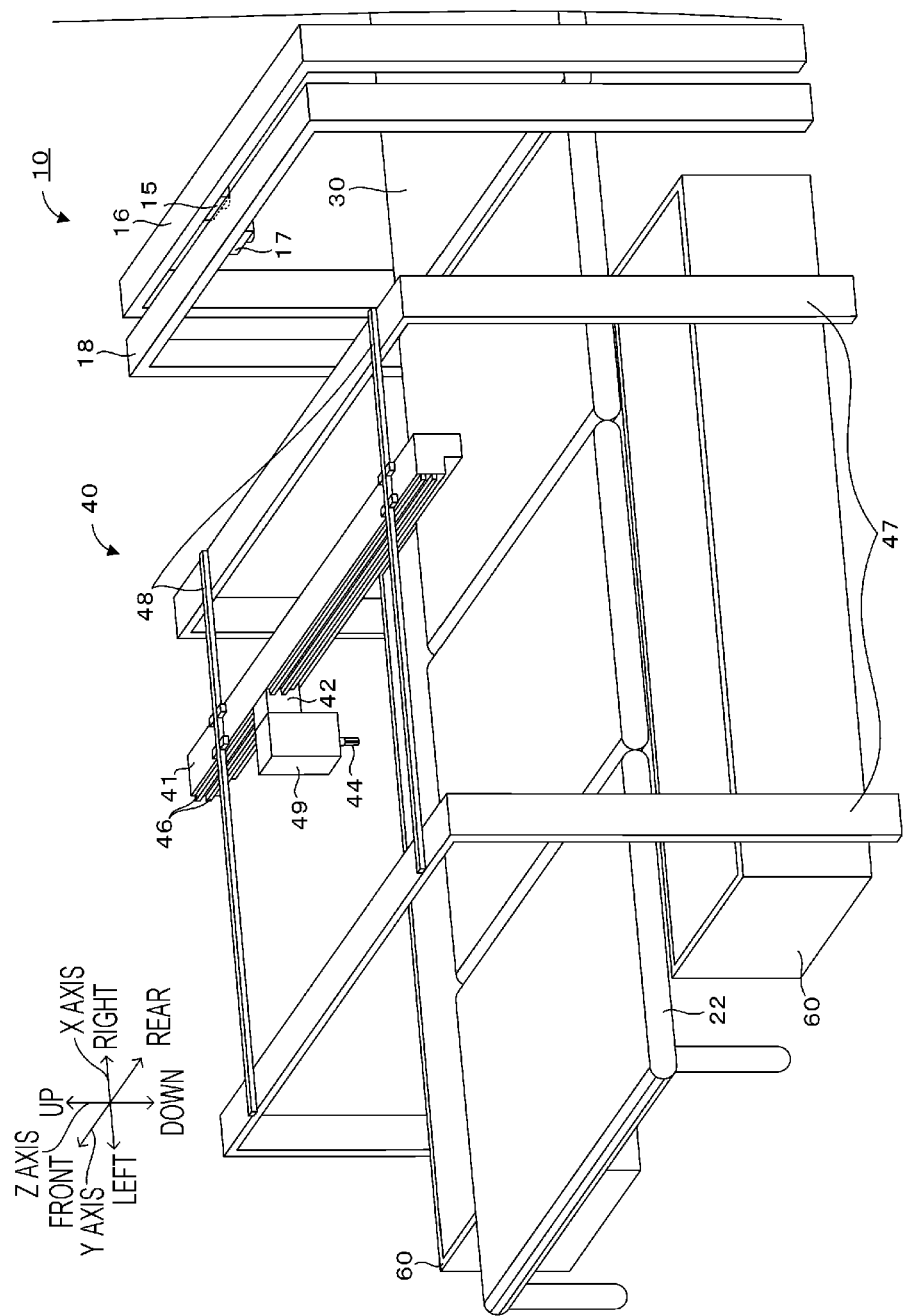
FIG. 2 is a perspective view illustrating a schematic configuration of foreign material removal system 10.
Figure 3:
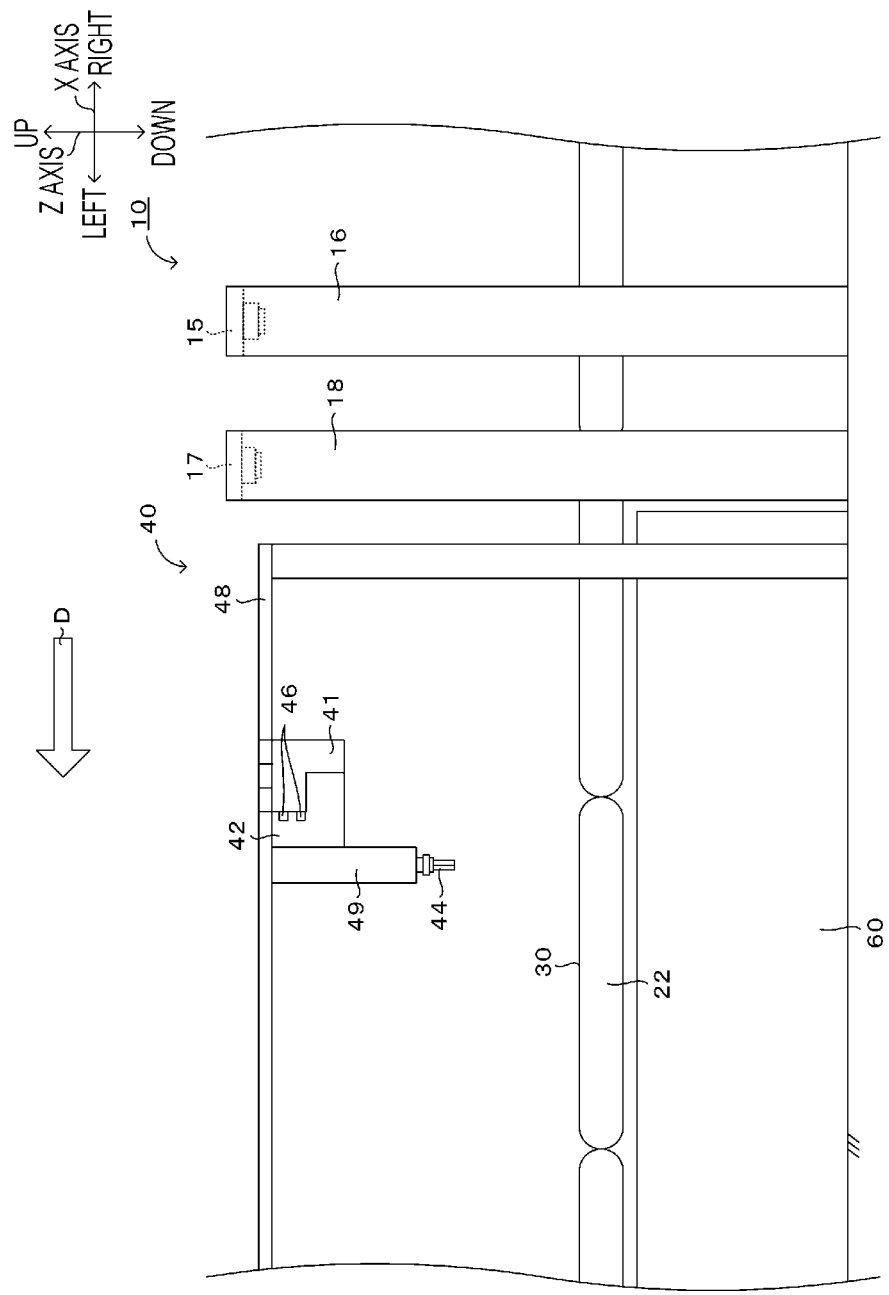
FIG. 3 is a side view illustrating the schematic configuration of foreign material removal system 10.
Figure 4:
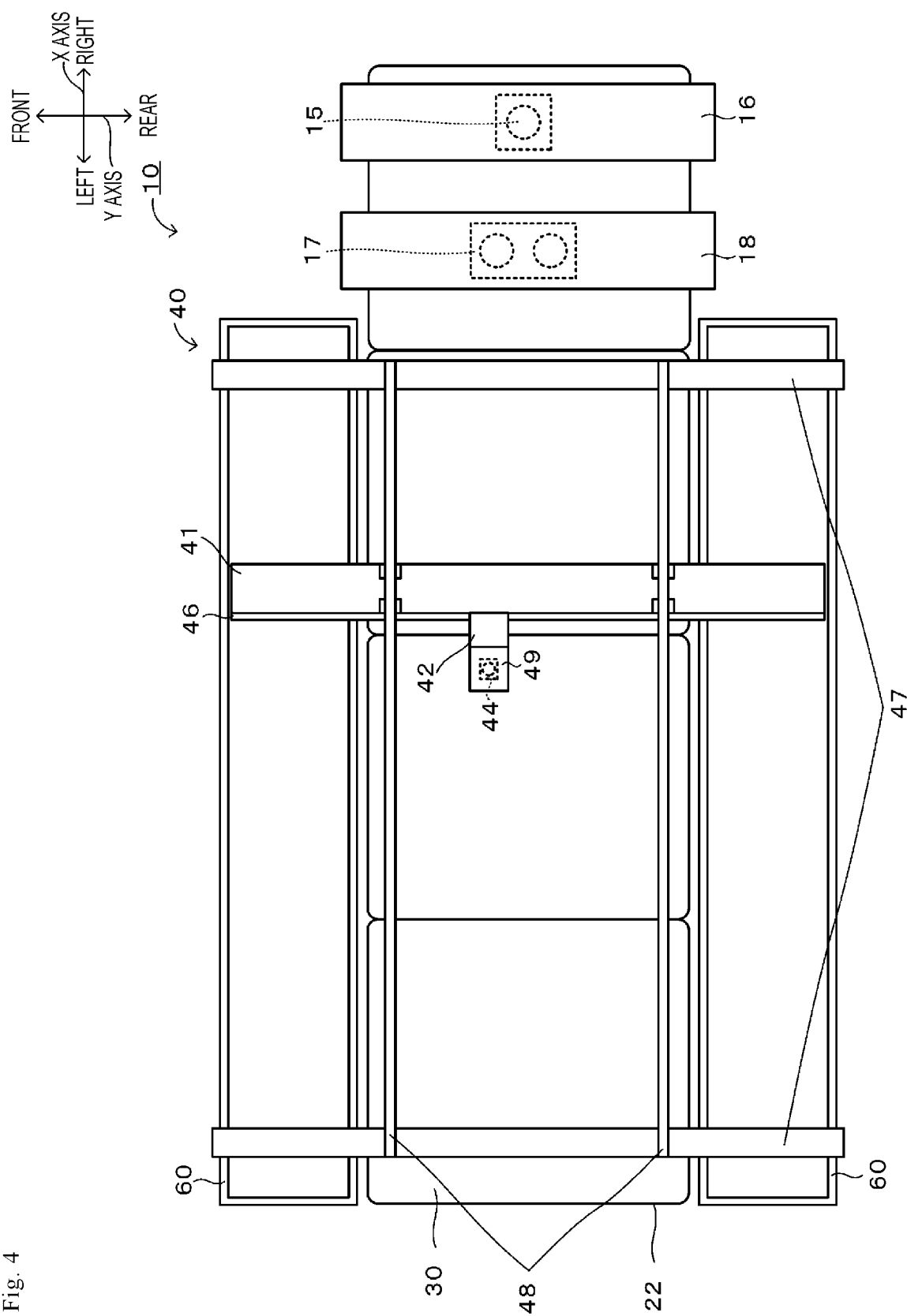
FIG. 4 is a plan view illustrating the schematic configuration of foreign material removal system 10.
Figure 5:
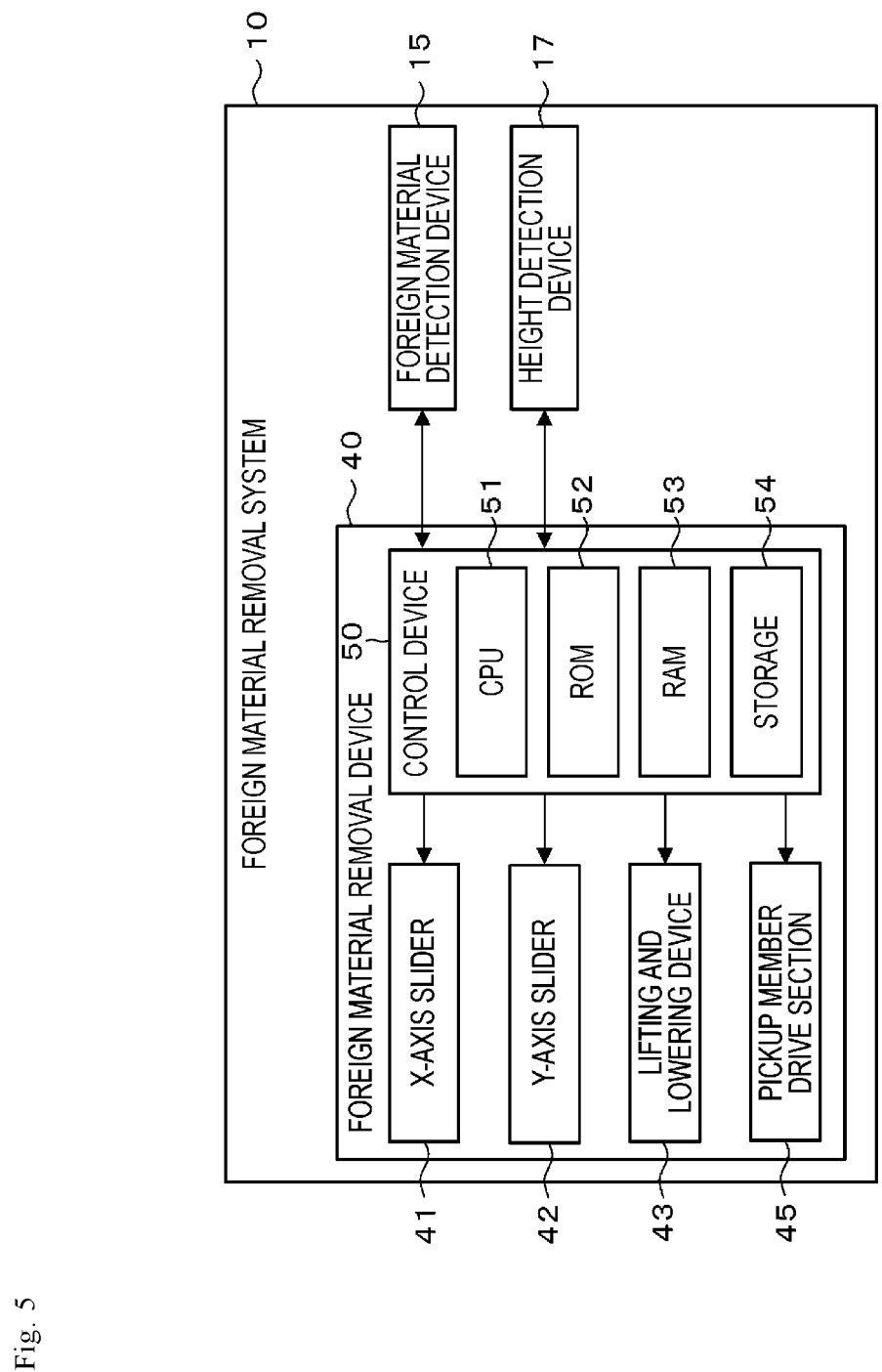
FIG. 5 is a block diagram illustrating an electrical connection relationship of foreign material removal system 10.

Hereinafter, an embodiment of the present disclosure will be described with reference to the accompanying drawings. FIG. 1 is a diagram illustrating a configuration of recycling system 1, FIG. 2 is a perspective view illustrating a schematic configuration of foreign material removal system 10, FIG. 3 is aside view illustrating the schematic configuration of foreign material removal system 10, FIG. 4 is a plan view illustrating the schematic configuration of foreign material removal system 10, and FIG. 5 is a block diagram illustrating an electrical connection relationship of foreign material removal system 10. In the present embodiment, the left-right direction, the front-rear direction, and the up-down direction are as illustrated in FIGS. 1 to 4 (in FIGS. 1 and 3, the front-rear direction is a direction vertical to the drawing plane, and in FIG. 4, the up-down direction is a direction vertical to the drawing plane). In addition, in the present embodiment, the direction where waste material 2 is conveyed by conveyance device 22 is referred to as conveyance direction D.

Waste material 2 processed by recycling system 1 is a mixture of recycling target object 3 to be recycled such as stone, sand, and concrete, and foreign material 4 such as paper, resin, wood, and metal.

As illustrated in FIG. 1, recycling system 1 is provided with first and second crushers 11a and 11b, first and second magnetic separators 12a and 12b, screen machine 13, conveyance devices 20 to 25, and foreign material removal system 10.

First crusher 11a is a device that first crushes waste material 2 as a raw material. First crusher 11a crushes waste material 2 so as to have a predetermined primary size or less (for example, 40 cm or less), for example. First magnetic separator 12a is a device that removes foreign material 4 of magnetic material contained in waste material 2 by magnetic force. Screen machine 13 is a device that separates waste material 2 having a size equal to or more than the primary size and waste material 2 having a size less than the primary size when waste material 2 passes above a mesh, for example. Second crusher 11b is a device that secondarily crushes waste material 2 to a size smaller than that of first crusher 11a. Second crusher 11b crushes waste material 2 so as to have a predetermined secondary size or less (for example, 10 cm or less). Second magnetic separator 12b is a device that removes from waste material 2 a magnetic material that cannot be completely removed by first magnetic separator 12a and foreign material removal system 10.

Conveyance devices 20 to 25 are devices that place waste material 2 on a conveyance surface and convey waste material 2 along conveyance direction D, and are configured as, for example, belt conveyors. Conveyance devices 20 to 25 may have configurations other than the belt conveyor as long as waste material 2 is conveyed.

As illustrated in FIGS. 1 to 4, foreign material removal system 10 includes conveyance device 22, foreign material detection device 15, height detection device 17, foreign material removal device 40, and foreign material storage member 60 (corresponding to a disposal place of the present disclosure).

Conveyance device 22 is a conveyance device that conveys waste material 2 in conveyance direction D. Conveyance device 22 includes conveyance surface 30, places waste material 2 on conveyance surface 30, and conveys waste material 2 at a constant speed (for example, 40 [m/min]).

Foreign material detection device 15 is disposed upstream of foreign material removal device 40 in conveyance direction D. Foreign material detection device 15 is a device for detecting foreign material 4 contained in waste material 2, and is configured as, for example, a color camera for capturing a color image of waste material 2 placed on conveyance surface 30 of conveyance device 22 and conveyed. Foreign material detection device 15 is held above conveyance surface 30 of conveyance device 22 by holding member 16 provided so as to straddle conveyance device 22 in the front-rear direction. Foreign material detection device 15 captures waste material 2 in a predetermined range of conveyance surface 30 from above conveyance surface 30 of conveyance device 22, and outputs color image data to control device 50 of foreign material removal device 40 (refer to FIG. 5).

Height detection device 17 is provided upstream of foreign material removal device 40 in conveyance direction D and downstream of foreign material detection device 15 in conveyance direction D. Height detection device 17 is a device that detects the height from conveyance surface 30, and is configured as, for example, a stereo camera including two cameras (not illustrated). Height detection device 17 is held above conveyance surface 30 of conveyance device 22 by holding member 18 provided so as to straddle conveyance device 22 in the front-rear direction. Height detection device 17 captures waste material 2 in a predetermined range of conveyance surface 30 from above conveyance surface 30 of conveyance device 22 by each camera, and outputs height detection image data to control device 50 of foreign material removal device 40 (refer to FIG. 5).

Foreign material removal device 40 is a device that removes foreign material 4 detected by foreign material detection device 15 from waste material 2, and is configured as, for example, an XY robot. Foreign material removal device 40 is provided downstream of foreign material detection device 15 in conveyance direction D. Foreign material removal device 40 includes X-axis slider 41, Y-axis slider 42, lifting and lowering device 43 (refer to FIG. 5), pickup member 44, pickup member drive section 45 (refer to FIG. 5), and control device 50 (refer to FIG. 5).

X-axis slider 41 is supported by a pair of front-rear guide rails 48 installed on a pair of left-right rail installing sections 47 disposed so as to straddle conveyance device 22 in the front-rear direction. X-axis slider 41 is movable in the X-axis direction by driving an X-axis motor (not illustrated) provided in X-axis slider 41.

Y-axis slider 42 is supported by a pair of upper and lower guide rails 46 provided on the left surface of X-axis slider 41 so as to extend in the Y-axis direction. Y-axis slider 42 is movable in the Y-axis direction by driving a Y-axis motor (not illustrated) provided in Y-axis slider 42.

Storage box 49 is attached to the left surface of Y-axis slider 42. Lifting and lowering device 43 (refer to FIG. 5) that moves pickup member 44 in the Z-axis direction is stored in storage box 49. Lifting and lowering device 43 can lift and lower pickup member 44 by driving a Z-axis motor (not illustrated) provided in lifting and lowering device 43.

Pickup member 44 has multiple claw portions (corresponding to gripping portions of the present disclosure), and can grasp and grip foreign material 4 from waste material 2 and release the gripping by opening and closing operations of the claw portions.

Pickup member drive section 45 (refer to FIG. 5) is stored in storage box 49 and is a driving device that axially rotates pickup member 44 and opens and closes the claw portion of pickup member 44 by driving.

As illustrated in FIG. 5, control device 50 is a computer including well-known CPU 51, ROM 52, RAM 53, and storage (for example, HDD or SSD) 54, and controls entire foreign material removal system 10. Control device 50 is connected to foreign material detection device 15 and height detection device 17. Control device 50 outputs a capturing command signal to foreign material detection device 15, outputs a capturing finger command to height detection device 17, inputs color image data from foreign material detection device 15, and inputs height detection image data from height detection device 17. In addition, control device 50 outputs a control signal to Y-axis slider 42, outputs a control signal to X-axis slider 41, outputs a control signal to lifting and lowering device 43, and outputs a control signal to pickup member drive section 45.

Foreign material storage member 60 is a box-shaped member for storing foreign material 4, the upper surface of which is opened. Foreign material storage member 60 is provided along conveyance direction D on both front-rear sides of conveyance device 22 so as to be adjacent to conveyance device 22.

Figure 6:
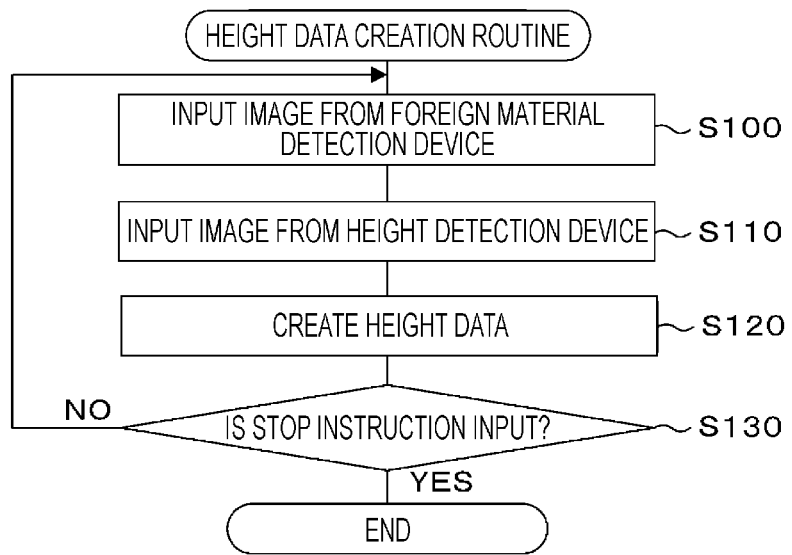
FIG. 6 is a flowchart illustrating an example of a height data creation routine.
Figure 7:
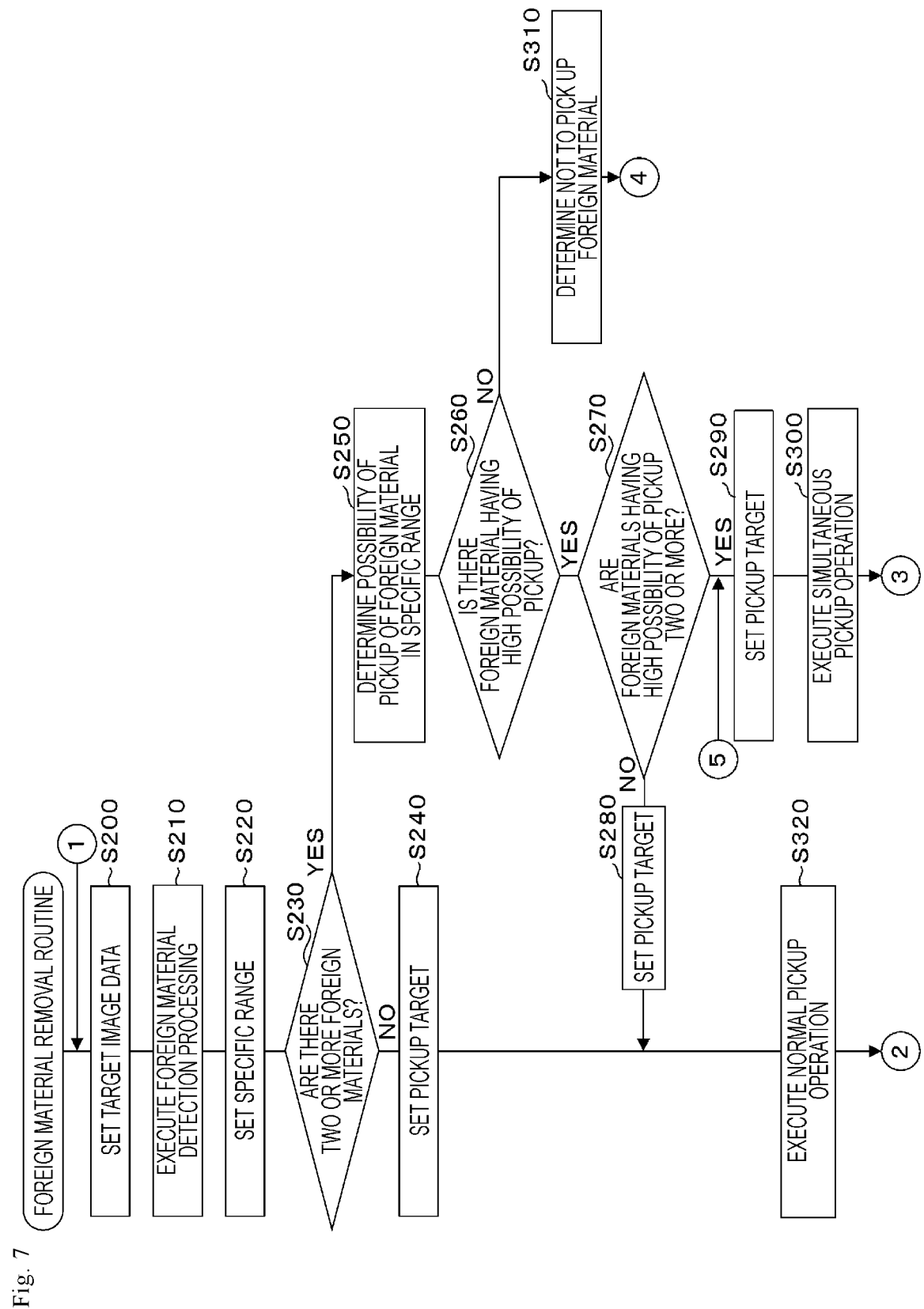
FIG. 7 is a flowchart illustrating an example of a foreign material removal routine.
Figure 8:
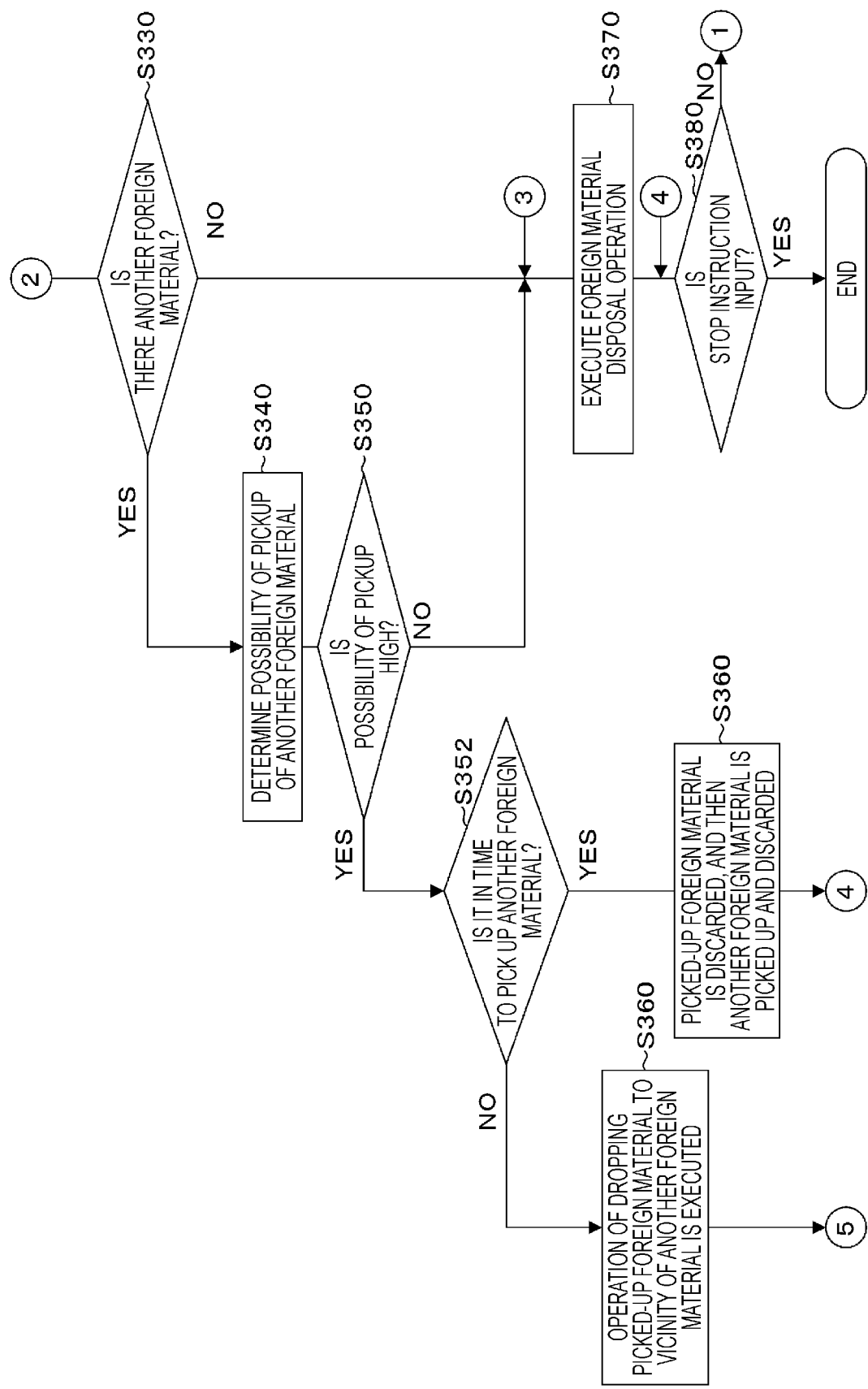
FIG. 8 is a flowchart illustrating an example of the foreign material removal routine.
Figure 9:
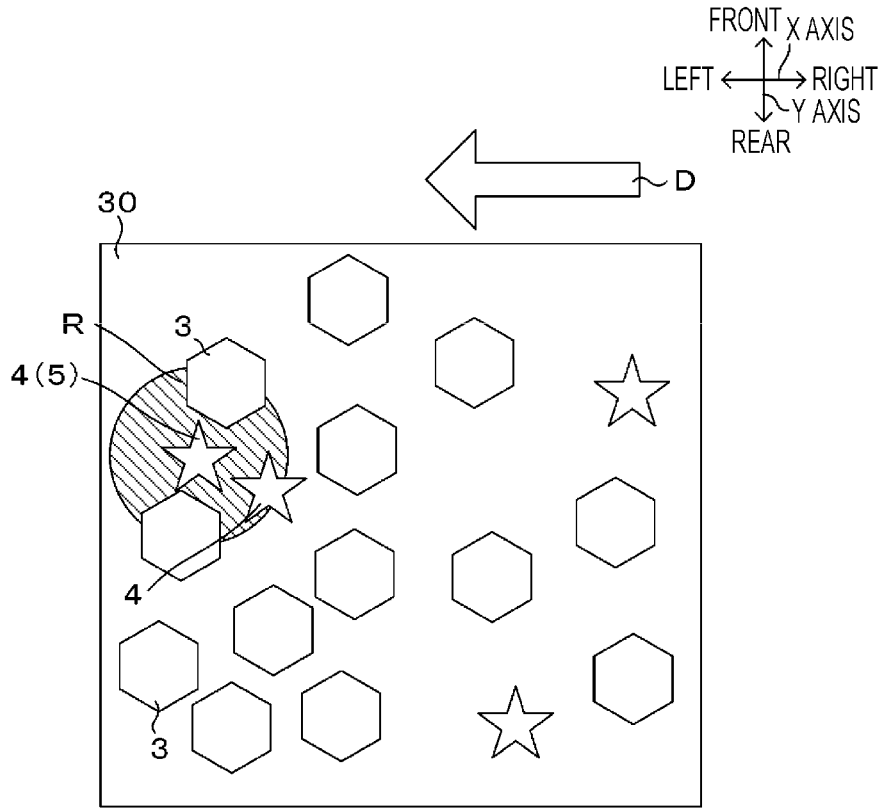
FIG. 9 is a diagram illustrating an example of a method of setting specific range R.
Figure 10:
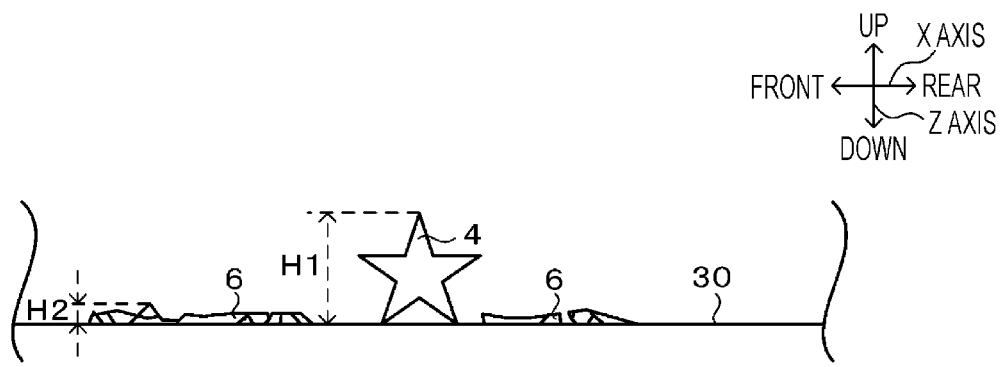
FIG. 10 is a diagram illustrating an example of a method of determining a possibility of pickup.
Figure 11:
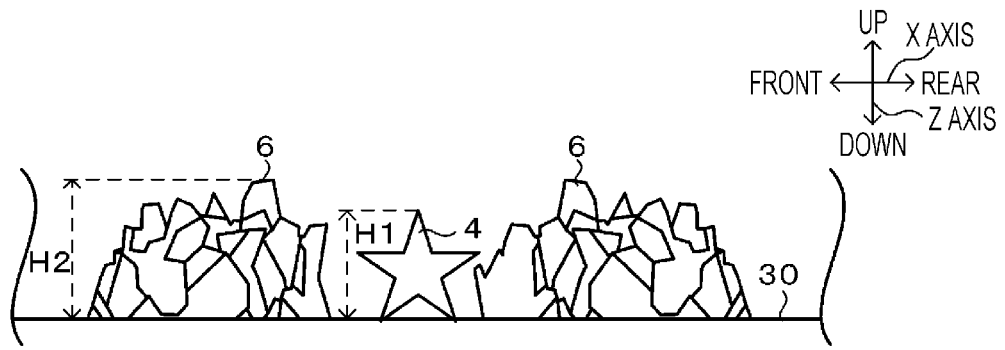
FIG. 11 is a diagram illustrating an example of a method of determining the possibility of pickup.

Next, an operation of foreign material removal system 10 configured in this manner will be described with reference to FIGS. 6 to 17. FIG. 6 is a flowchart illustrating an example of a height data creation routine, FIGS. 7 and 8 are flowcharts illustrating an example of a foreign material removal routine, FIG. 9 is a diagram illustrating an example of a method of setting specific range R, FIGS. 10 and 11 are diagrams illustrating an example of a method of determining a possibility of pickup, FIGS. 12 to 15 are diagrams illustrating an example of a determination result of the possibility of pickup of foreign material 4, FIG. 16 is a diagram illustrating an operation of foreign material removal device 40 when a simultaneous pickup operation is executed, and FIG. 17 is a diagram illustrating an operation of foreign material removal device 40 when an operation of dropping foreign material 4 closer to another foreign material 4 is executed. In FIGS. 9 to 17, for convenience, recycling target object 3 is illustrated in a hexagonal shape (except FIGS. 10 and 11), and foreign material 4 is illustrated in a starry shape. In addition, in FIGS. 16 and 17, the callout portion illustrates a state where conveyance surface 30 of conveyance device 22 is viewed from above.

First, the height data creation routine will be described. This routine is stored in storage 54 of control device 50, and is executed by CPU 51 of control device 50 after the start instruction is input by the operator.

When the present routine is started, CPU 51 inputs foreign material detection image data (color image data) from foreign material detection device 15 at each predetermined timing (S100). Specifically, CPU 51 inputs foreign material detection image data captured by foreign material detection device 15 and stores the foreign material detection image data in storage 54. The predetermined timing is the timing at which waste material 2 is conveyed by conveyance device 22 by the length in the left-right direction of a capturing range of the foreign material detection image data.

Subsequently, CPU 51 inputs the height detection image data from height detection device 17 (S110). Specifically, CPU 51 inputs height detection image data captured by two cameras provided in height detection device 17, and stores the height detection image data in storage 54. The height detection image data is obtained by capturing a range corresponding to the capturing range of the foreign material detection image data input in S100.

Subsequently, CPU 51 creates height data (S120). The height data is created as follows, for example. That is, first, CPU 51 calculates the distance from height detection device 17 to each pixel based on the distance, parallax, and focal length between the two cameras of height detection device 17 for each pixel of the height detection image data. Next, CPU 51 calculates the difference between the distance from height detection device 17 to conveyance surface 30 and the distance from height detection device 17 to a target calculated in this manner as the height of each pixel with respect to conveyance surface 30. CPU 51 stores each pixel and the height calculated in this manner in storage 54 in association with the foreign material detection image data corresponding to the height detection image data used this time.

Subsequently, CPU 51 determines whether a stop instruction is input (S130). When the stop instruction is not input by the operator, CPU 51 returns to S100 again. On the other hand, when the stop instruction is input by the operator, CPU 51 ends the present routine.

Next, a foreign material removal routine will be described. This routine is stored in storage 54 of control device 50, and is executed by CPU 51 of control device 50 after the start instruction is input by an operator via an input device (not illustrated).

When the present routine is started, CPU 51 sets a target image (S200). Specifically, CPU 51 sets, as a target image, foreign material detection image data that is not yet set as a target image among the foreign material detection image data stored in storage 54 in S100 of the height data creation routine. In a case where there are multiple such foreign material detection image data, CPU 51 sets the oldest foreign material detection image data as the target image.

Subsequently, CPU 51 executes foreign material detection processing (S210). The foreign material detection processing is executed as follows. That is, first, CPU 51 detects a region of waste material 2 in the target image. Next, CPU 51 acquires RGB values in the region of waste material 2. Next, CPU 51 compares the RGB value in the region of waste material 2 with the range of the RGB value of recycling target object 3 stored in advance in storage 54. CPU 51 detects a region that is outside the range of the RGB value of recycling target object 3 among the region of waste material 2, as a region of foreign material 4.

Subsequently, CPU 51 sets specific range R (S220). Specific range R is a range as illustrated in FIG. 9. That is, CPU 51 sets foreign material 4 located farthest downstream among foreign materials 4 contained in the current target image as specific foreign material 5. Next, CPU 51 sets, as specific range R, a circular range centered on specific foreign material 5, in which two or more foreign materials 4 can be collectively gripped by one opening and closing operation of pickup member 44. Although not illustrated, when there is no foreign material 4 in the target image, the process skips to S380.

Figure 12:
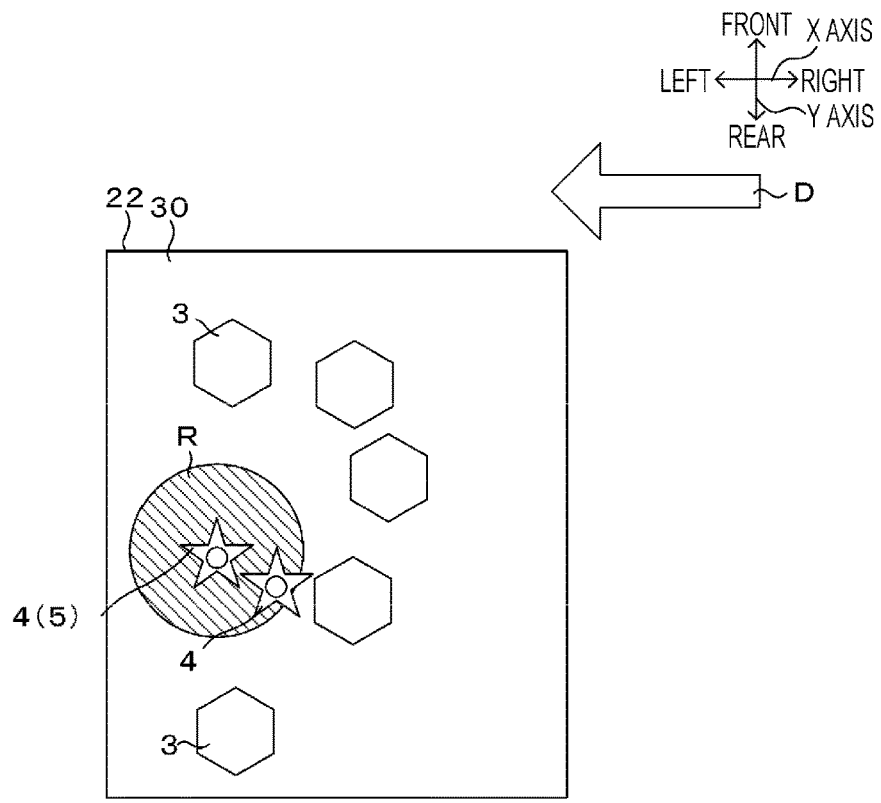
FIG. 12 is a diagram illustrating an example of a determination result of a possibility of pickup of foreign material 4.
Figure 13:
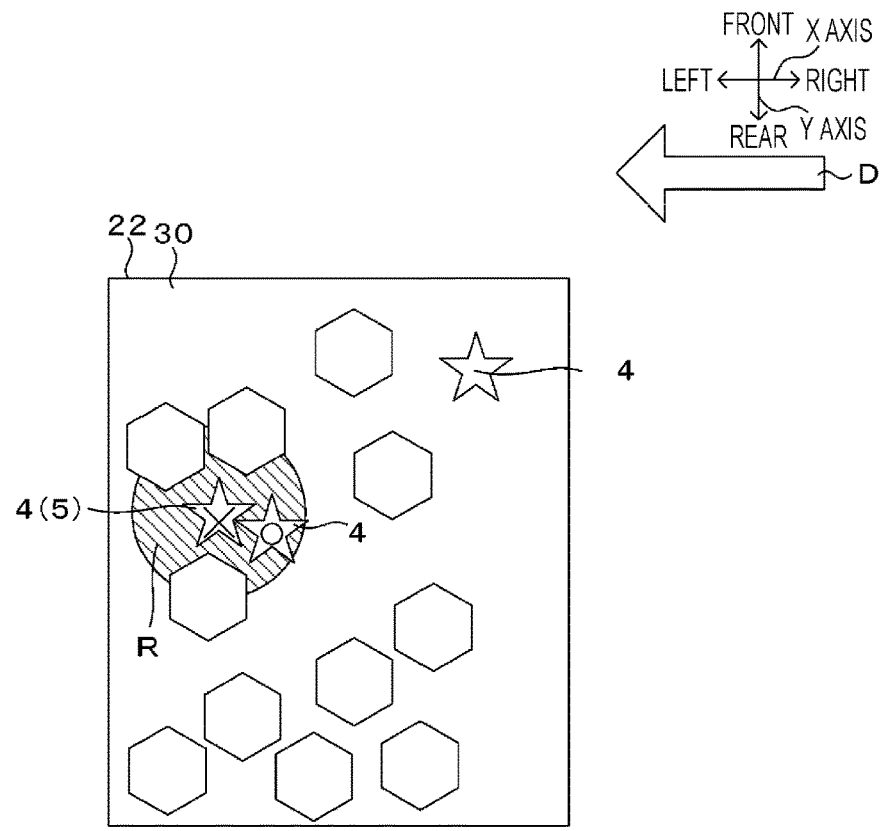
FIG. 13 is a diagram illustrating an example of the determination result of the possibility of pickup of foreign material 4.
Figure 14:
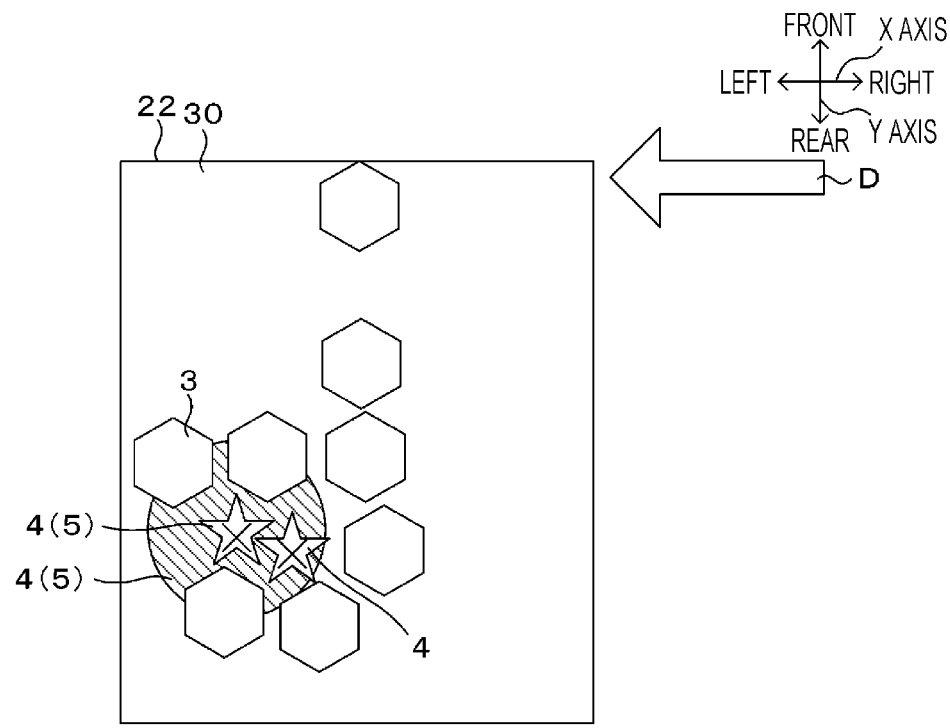
FIG. 14 is a diagram illustrating an example of the determination result of the possibility of pickup of foreign material 4.
Figure 15:
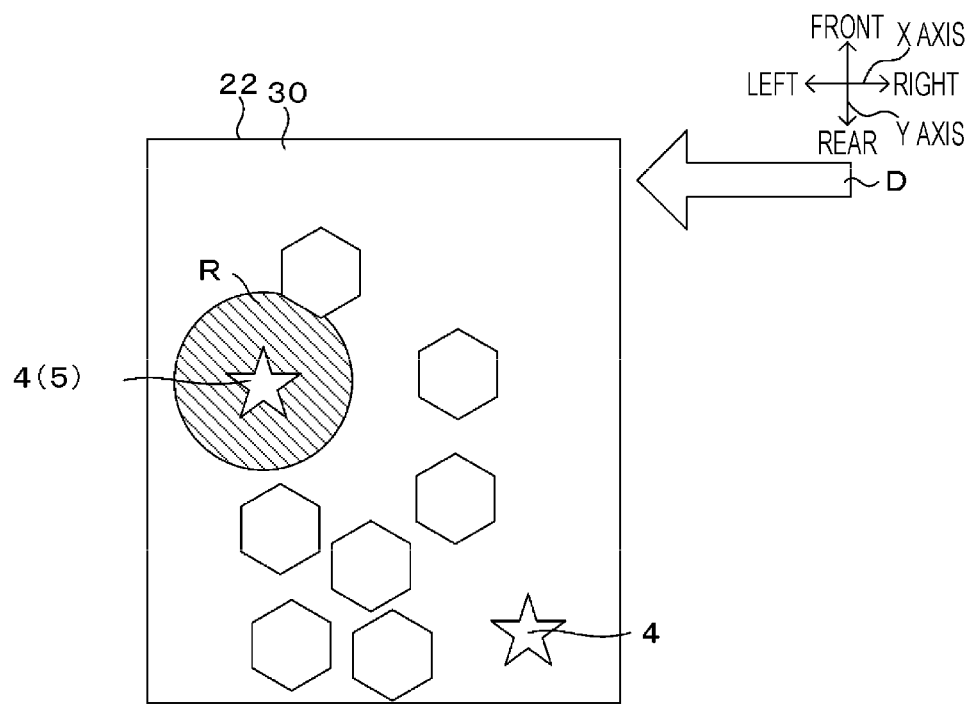
FIG. 15 is a diagram illustrating an example of the determination result of the possibility of pickup of foreign material 4.

Subsequently, CPU 51 determines whether there are two or more foreign materials 4 in specific range R (S230). Specifically, as illustrated in FIGS. 12 to 14, when there are two or more foreign materials 4 including specific foreign material 5 in specific range R, CPU 51 performs an affirmative determination. On the other hand, when there is only specific foreign material 5 in specific range R as illustrated in FIG. 15, CPU 51 performs a negative determination.

When a negative determination is performed in S230, CPU 51 sets a pickup target (S240). For example, in FIG. 15, specific foreign material 5 is set as the pickup target. After S240, CPU 51 proceeds to S320.

On the other hand, when an affirmative determination is performed in S230, CPU 51 determines the possibility of pickup of two or more foreign materials 4 in specific range R (S250). The possibility of pickup is the possibility of gripping foreign material 4 by the opening and closing operation of pickup member 44. The possibility of pickup is obtained based on at least one of the feature of foreign material 4 (the exposed area of foreign material 4 in the present embodiment) or ratio Q (H2/H1) of the surrounding situation of foreign material 4 (height H2 (refer to FIGS. 10 and 11) of peripheral member 6 existing around foreign material 4 to height H1 (refer to FIGS. 10 and 11) of foreign material 4 in the present embodiment). Peripheral member 6 may be recycling target object 3 or foreign material 4. Whether pickup member 44 can grasp foreign material 4 often depends on the exposed area of foreign material 4 or ratio Q of height H2 of peripheral member 6 existing around foreign material 4 to height H1 of foreign material 4.

In a case where the possibility of pickup is determined based on the feature of foreign material 4, CPU 51 first sets one of foreign materials 4 in specific range R as a determination target. Next, CPU 51 calculates the exposed area of foreign material 4 set as the determination target. Specifically, CPU 51 obtains the number of pixels in the region of foreign material 4 set as the determination target, and multiplies the obtained number of pixels by the area per pixel to calculate the exposed area of foreign material 4 set as the determination target. Next, CPU 51 determines the possibility of pickup based on the exposed area of foreign material 4 set as the determination target. At this time, CPU 51 determines that the larger the exposed area of foreign material 4, the higher the possibility of pickup, and determines that the smaller the exposed area, the lower the possibility of pickup. This is because, the larger the exposed area of foreign material 4, the higher the possibility that foreign material 4 is not buried, pickup member 44 is likely to grasp foreign material 4, and the higher the possibility of pickup. In addition, this is because, as the exposed area of foreign material 4 decreases, the possibility that foreign material 4 is buried increases, pickup member 44 is unlikely to grasp foreign material 4, and the possibility of pickup decreases. For example, when thresholds Sa and Sb are set in advance, and the exposed area of foreign material 4 set as the determination target is less than Sa, the possibility of pickup may be determined to be "low", when the exposed area is Sa or more and less than Sb, the possibility of pickup may be determined to be "medium", and when the exposed area is Sb or more, the possibility of pickup may be determined to be "high". Thresholds Sa and Sb are set based on the size of the claw portions provided on pickup member 44, the interval between the claw portions, and the like. When the maximum area that can be grasped by the claw portion is set, and the maximum area is exceeded, the possibility of pickup may be determined to be "low".

In a case where the possibility of pickup is determined based on the surrounding situation of foreign material 4, CPU 51 detects height H1 of foreign material 4 set as the determination target as illustrated in FIGS. 10 and 11 by reflecting the position of foreign material 4 (XY coordinates) set as the determination target in the target image and the height data created in S120. Next, as illustrated in FIGS. 10 and 11, CPU 51 detects height H2 of peripheral member 6 existing around foreign material 4 set as the determination target based on the height data created in S120. Next, CPU 51 determines the possibility of pickup based on ratio Q of height H2 of peripheral member 6 existing around foreign material 4 to height H1 of foreign material 4. At this time, CPU 51 determines that the lower ratio Q is less than 1, the higher the possibility of pickup, and determines that the higher ratio Q is more than 1, the lower the possibility of pickup. This is because, the lower ratio Q is lower than 1, the lower possibility that peripheral member 6 existing around foreign material 4 interferes with the operation of pickup member 44 to grasp foreign material 4, pickup member 44 is likely to grasp foreign material 4, and the higher the possibility of pickup. In addition, this is because, as ratio Q is higher than 1, there is a high possibility that peripheral member 6 existing around foreign material 4 interferes with the operation of pickup member 44 to grasp foreign material 4, pickup member 44 is unlikely to grasp foreign material 4, and the possibility of pickup decreases. For example, when thresholds Ta (less than 1) and Tb (1 or more) are set in advance, and ratio Q is less than Ta, the possibility of pickup may be determined to be "high", when ratio Q is Ta or more and less than Tb, the possibility of pickup may be determined to be "medium", and when ratio Q is Tb or more, the possibility of pickup may be determined to be "low". Thresholds Ta and Tb are set based on the size of the claw portions provided on pickup member 44, the interval between the claw portions, and the like.

In a case where the possibility of pickup is determined based on the feature of foreign material 4 and the surrounding situation of foreign material 4, the possibility of pickup is determined by a combination of the determination result based on the feature of foreign material 4 and the determination result based on the surrounding situation of foreign material 4. For example, combinations of the determination result based on the feature of foreign material 4 and the determination result based on the surrounding situation of foreign material 4 include (1) a case where both of the determination results are "low", (2) a case where the first determination result is "low" and the second determination result is "medium", (3) a case where the first determination result is "low" and the second determination result is "high", (4) a case where both of the determination results are "medium", (5) a case where the first determination result is "medium" and the second determination result is "high", and (6) a case where both of the determination results are "high", and CPU 51 determines that the possibility of pickup increases in this order.

Here, in FIGS. 12 to 14, foreign material 4 determined that the possibility of pickup is high in S250 is marked with an o mark in a starry shape, and foreign material 4 determined that the possibility of pickup is low in S250 is marked with an x mark in a starry shape.

Subsequently, CPU 51 determines whether there is foreign material 4 having a high possibility of pickup in specific range R (S260). In the present embodiment, an affirmative determination is performed when the possibility of pickup is "high" or "medium". Specifically, as illustrated in FIGS. 12 and 13, when there is foreign material 4 having a high possibility of pickup in specific range R, CPU 51 performs an affirmative determination. On the other hand, as illustrated in FIG. 14, when there is no foreign material 4 having a high possibility of pickup in specific range R, CPU 51 performs a negative determination.

When an affirmative determination is performed in S260, CPU 51 determines whether there are two or more foreign materials 4 having a high possibility of pickup in specific range R (S270). Specifically, as illustrated in FIG. 12, when there are two or more foreign materials 4 (two in FIG. 12) determined that the possibility of pickup is high in S260 in specific range R, CPU 51 performs an affirmative determination. On the other hand, as illustrated in FIG. 13, when the number of foreign materials 4 determined that the possibility of pickup is high in S260 is less than two (one) in specific range R, a negative determination is performed.

When a negative determination is performed in S270, CPU 51 sets a pickup target (S280). Specifically, as illustrated in FIG. 13, CPU 51 sets one foreign material 4 determined that the possibility of pickup is high in S260 among foreign materials 4 in specific range R as the pickup target, and determines not to pick up foreign material 4 not set as the pickup target among foreign materials 4 in specific range R. After S280, CPU 51 proceeds to S320.

On the other hand, when an affirmative determination is performed in S270, CPU 51 sets two or more foreign materials 4 in specific range R as illustrated in FIG. 12 as pickup targets (S290).

Figure 16A:
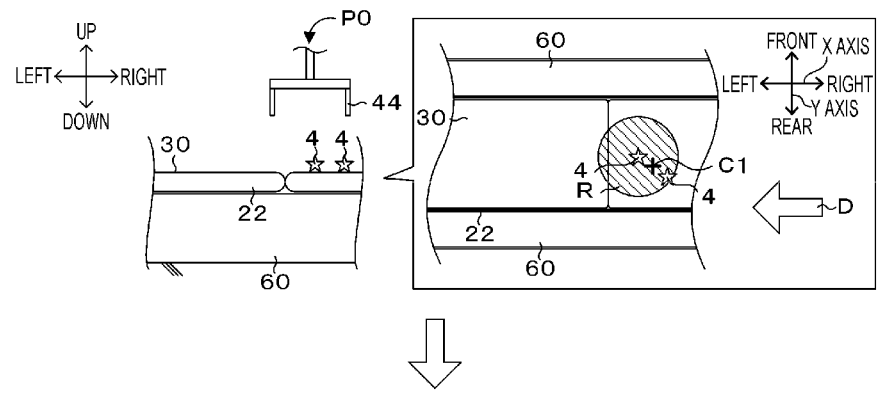
FIG. 16 is a diagram illustrating an operation of foreign material removal device 40 when a simultaneous pickup operation is executed.
Figure 16B:
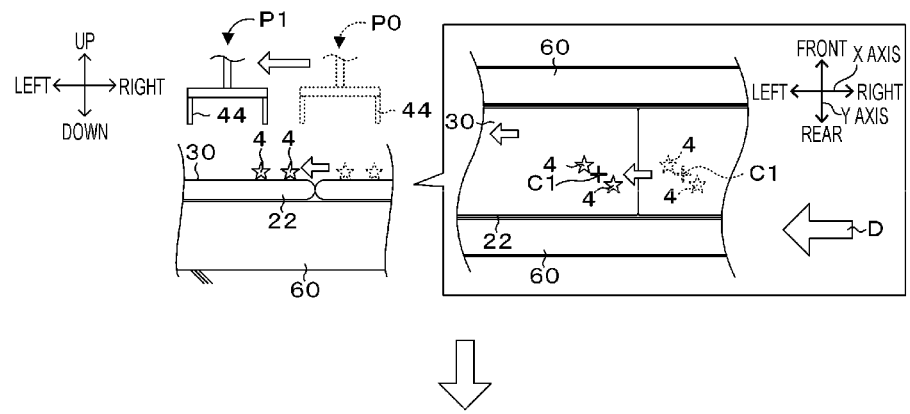
Figure 16C:
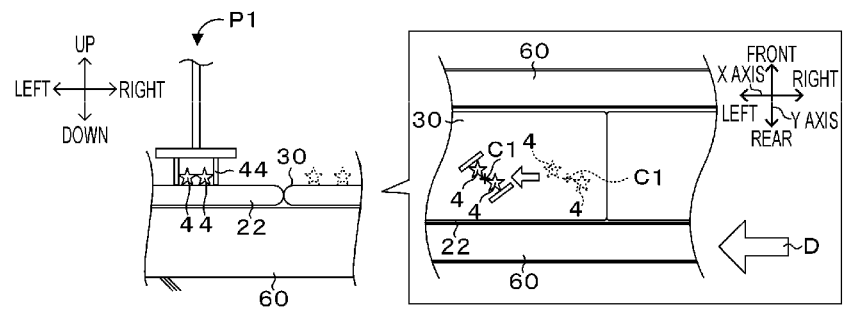

Subsequently, CPU 51 executes a simultaneous pickup operation simultaneously picking up two or more foreign materials 4 (S300). The simultaneous pickup operation is executed as follows. That is, first, as illustrated in FIG. 16A, CPU 51 obtains the XY coordinates of each foreign material 4 in specific range R at the current time based on the XY coordinates of each foreign material 4 when foreign material 4 is detected in S210, the elapsed time from the detection of each foreign material 4 in S210, and the conveying speed of conveyance device 22. Next, as illustrated in FIG. 16A, CPU 51 sets pickup center C1 at the current time based on the XY coordinates of each foreign material 4. In a case where there are two foreign materials 4 in specific range R, the center of the line segment connecting foreign materials 4 is set as pickup center C1 at the current time. On the other hand, in a case where there are three or more foreign materials 4 in specific range R, CPU 51 sets the center of gravity of the polygon having three or more foreign materials 4 as vertices as pickup center C1 at the current time. Next, as illustrated in FIG. 16A, CPU 51 inputs signals from encoders (not illustrated) provided on X-axis slider 41 and Y-axis slider 42, and obtains the position of pickup member 44 (referred to as current position P0) at the current time. Next, CPU 51 sets foreign material pickup position P1 when pickup member 44 simultaneously grips two or more foreign materials 4. Foreign material pickup position P1 is set on a straight line that passes through pickup center C1 at the current time and is parallel to the X axis. In addition, foreign material pickup position P1 is set to a position where foreign material 4 can be picked up by moving pickup member 44 from current position P0 and reaching foreign material pickup position P1 before pickup center C1 is conveyed to directly below foreign material pickup position PT. In a case where multiple such positions exist, the farthest upstream position is set to foreign material pickup position PT. Next, as illustrated in FIG. 16B, CPU 51 causes Y-axis slider 42 and X-axis slider 41 to move pickup member 44 to foreign material pickup position PT. Next, based on pickup center C1, when pickup center C1 reaches a position directly below foreign material pickup position P1, as illustrated in FIG. 16C, CPU 51 drives and causes lifting and lowering device 43 and pickup member drive section 45 to open and close the claw portion of pickup member 44 and simultaneously pick up two or more foreign materials 4 by pickup member 44. In a state where foreign material 4 is gripped by pickup member 44, CPU 51 drives and causes lifting and lowering device 43 to lift pickup member 44 and simultaneously remove two or more foreign materials 4 from waste material 2. After S300, CPU 51 proceeds to S370.

On the other hand, when the negative determination is performed in S260, CPU 51 determines not to pick up foreign material 4 (S310). After S310, CPU 51 proceeds to S380.

Here, the processing executed by CPU 51 after S240 or S280 will be described. After S240 or S280, CPU 51 executes a normal pickup operation on foreign material 4 determined as the pickup target in S240 or S280 (S320). In S320, CPU 51 executes the same processing as the simultaneous pickup operation in S290 except that foreign material 4 set as the pickup target is set as pickup center C1.

Subsequently, CPU 51 determines whether there is another foreign material 4 outside specific range R (S330). In the target image set in S200, as illustrated in FIG. 15, when there is another foreign material 4 outside specific range R, CPU 51 performs an affirmative determination, otherwise, CPU 51 performs a negative determination. When the negative determination is performed in S330, CPU 51 proceeds to S370.

On the other hand, when the affirmative determination is performed in S330, CPU 51 determines the possibility of pickup of another foreign material 4 outside specific range R (S340). In S340, CPU 51 executes the same processing as that in S250. Subsequently, CPU 51 determines whether the possibility of pickup of another foreign material 4 is high based on the determination result in 340 (S350). In S350, CPU 51 executes the same processing as that in S260. When a negative determination is performed in S350, CPU 51 proceeds to S370.

On the other hand, when an affirmative determination is performed in S350, CPU 51 predicts whether it is in time to pick up another foreign material 4 after picked-up foreign material 4 is carried to foreign material storage member 60 and discarded (S352). For example, as illustrated in FIGS. 13 and 15, in a case where there is another foreign material 4 on upstream of specific range R in conveyance direction D, such a prediction is performed by comparing an expected time at which another foreign material 4 finishes passing through a pickup possible region set in advance between the pair of rail installing sections 47 with an expected time at which pickup member 44 returns after carrying the pickup target to foreign material storage member 60 and discarding the pickup target.

Figure 17A:
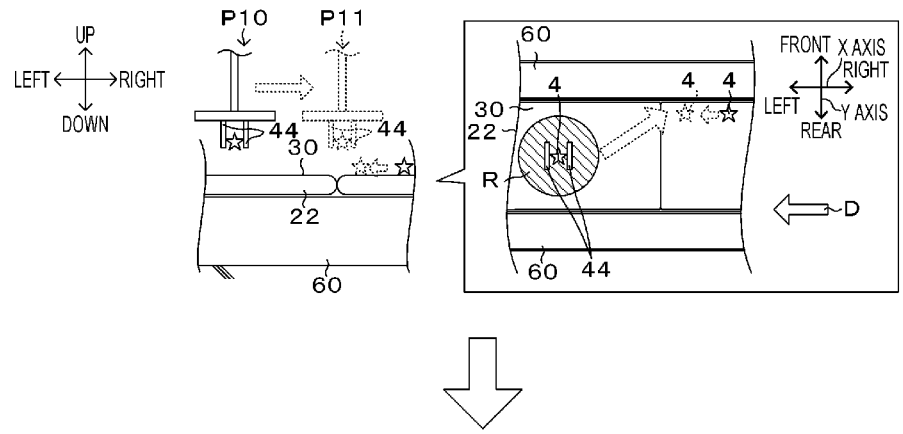
FIG. 17 is a diagram illustrating an operation of foreign material removal device 40 when an operation of dropping foreign material 4 close to another foreign material 4 is executed.
Figure 17B:
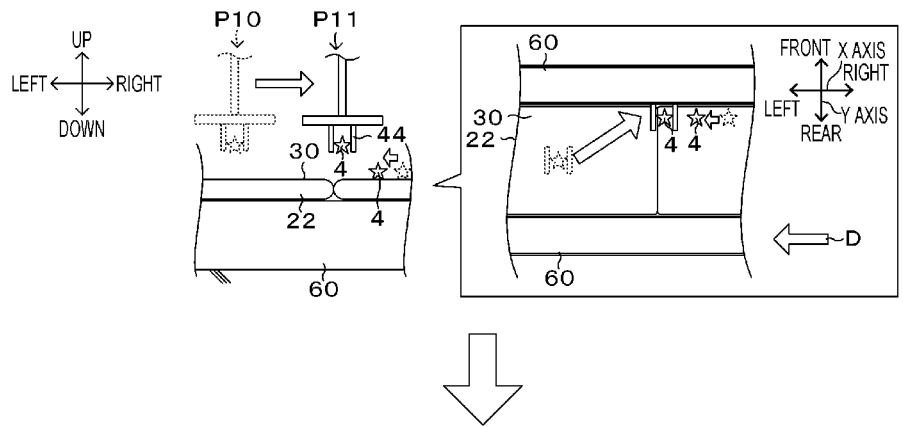
Figure 17C:
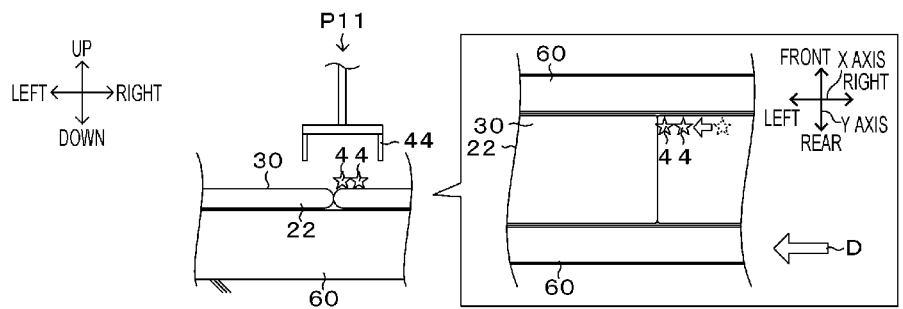

When it is predicted in S352 that it is not in time to pick up another foreign material 4, CPU 51 executes an operation of dropping foreign material 4 picked up in S320 to the vicinity of another foreign material 4 outside specific range R (S360). This processing is executed as follows, for example. That is, first, CPU 51 obtains the XY coordinates of another foreign material 4 at the current time based on the XY coordinates when another foreign material 4 is detected in S210, the elapsed time from the detection of another foreign material 4 in S210, and the conveying speed of conveyance device 22. Next, as illustrated in FIG. 17A, CPU 51 obtains the position of pickup member 44 (referred to as current position P10) at the current time similar to the simultaneous pickup operation described above. Next, CPU 51 sets a position of pickup member 44 (referred to as drop position P11) when picked-up foreign material 4 is dropped to the vicinity of another foreign material 4. Drop position P11 is set to a position where pickup member 44 can move from current position P10 to reach drop position P11 before another foreign material 4 is conveyed to the vicinity of drop position P11, and drop picked-up foreign material 4 onto conveyance surface 30. In a case where there are multiple such positions, the farthest upstream position in conveyance direction D among the positions where the distance between dropped foreign material 4 and another foreign material 4 is the smallest when foreign material 4 picked up by pickup member 44 is dropped onto conveyance surface 30 is set as drop position P11. Next, as illustrated in FIG. 17B, CPU 51 causes X-axis slider 41 and Y-axis slider 42 to move pickup member 44 to drop position P11. As illustrated in FIG. 17C, after confirming that another foreign material 4 approaches drop position P11 based on the XY coordinates of another foreign material 4, CPU 51 causes pickup member drive section 45 to close and open the claw portions of pickup member 44, release the gripping of foreign material 4 by pickup member 44, and drop foreign material 4 onto conveyance surface 30. After S360, CPU 51 returns to S290 again, sets foreign material 4 dropped on conveyance surface 30 and another foreign material 4 as pickup targets (S290), and causes various members to simultaneously grip foreign material 4 and another foreign material 4 by pickup member 44 and remove foreign material 4 and another foreign material 4 from waste material 2 (S300). On the other hand, when it is predicted in S352 that it is in time to pick up another foreign material 4, CPU 51 causes various members to discard foreign material 4 picked up in S320 and then pick up and discard another foreign material 4 (S354). After S354, CPU 51 proceeds to S380.

After S300, after the negative determination is performed in S330, or after the negative determination is performed in S350, CPU 51 executes a foreign material disposal operation (S370). Specifically, CPU 51 causes Y-axis slider 42 to move pickup member 44 directly above foreign material storage member 60. CPU 51 causes pickup member drive section 45 to open the closed claw portions of pickup member 44 and discard foreign material 4 into foreign material storage member 60.

After S310 after S354, or after S370, CPU 51 determines whether a stop instruction is input (S380). When the stop instruction is not input by the operator, CPU 51 returns to S200. On the other hand, when the stop instruction is input by the operator, CPU 51 ends the present routine.

In foreign material removal system 10 described above, the possibility of pickup of foreign material 4 is determined based on at least one of the feature or the surrounding situation of foreign material 4 detected by foreign material detection device 15, and whether to pick up foreign material 4 is determined based on the possibility of pickup. Accordingly, since foreign material removal device 40 can pick up foreign material 4 having a high possibility of pickup, and prevent foreign material 4 having a low possibility of pickup from being picked up, the probability of successfully picking up foreign material 4 is increased. Accordingly, foreign material 4 can be efficiently removed.

In addition, in foreign material removal system 10, foreign material removal device 40 includes pickup member 44 that grasps and grips foreign material 4 by the opening and closing operation, and determines the possibility of gripping foreign material 4 by the claw portion of pickup member 44 based on at least one of the feature or the surrounding situation of foreign material 4 detected by foreign material detection device 15 when determining the possibility of pickup of foreign material 4. Accordingly, foreign material 4 can be efficiently removed in foreign material removal device 40 having pickup member 44 that grasps and grips foreign material 4 by the opening and closing operation. In addition, in foreign material removal system 10, the exposed area of foreign material 4 detected by foreign material detection device 15 is used as the feature of foreign material 4, and the height of peripheral member 6 existing around foreign material 4 with respect to the height of foreign material 4 detected by foreign material detection device 15 is used as the surrounding situation of foreign material 4. Therefore, the possibility of pickup of foreign material 4 can be appropriately determined. In addition, foreign material removal device 40 determines that the smaller the exposed area of foreign material 4, the lower the possibility of pickup, and determines that the higher the height of peripheral member 6 existing around foreign material 4 with respect to the height of foreign material 4, the lower the possibility of pickup. Therefore, the possibility of removal of foreign material 4 can be determined more appropriately.

Furthermore, in foreign material removal system 10, foreign material removal device 40 collectively picks up two or more foreign materials 4, carries foreign materials 4 to foreign material storage member 60, and discards foreign materials 4. Accordingly, foreign materials 4 can be efficiently removed as compared with the case where foreign materials 4 are picked up one by one, carried to foreign material storage member 60, and discarded.

In foreign material removal device 10, when it is predicted that it is not in time even to execute an operation of individually picking up the two or more foreign materials 4, carrying foreign materials 4 to foreign material storage member 60, and discarding foreign materials 4, two or more foreign materials 4 are collectively picked up, carried to foreign material storage member 60, and discarded. Therefore, it is possible to reduce the loss of pickup of foreign material 4 that can be picked up.

Furthermore, foreign material removal device 40 includes pickup member 44 that grasps and grips foreign material 4 by the opening and closing operation, and when two or more foreign materials 4 exist in specific range R in which two or more foreign materials 4 can be collectively gripped by one opening and closing operation, two or more foreign materials 4 are collectively gripped by one opening and closing operation of pickup member 44, carried to foreign material storage member 60, and discarded. Therefore, foreign material 4 can be efficiently removed in foreign material removal device 40 including pickup member 44 that grasps and grips foreign material 4 by the opening and closing operation.

In addition, in foreign material removal system 10, foreign material removal device 40 includes pickup member 44 that grasps and grips foreign material 4 by the opening and closing operation, drops foreign material 4 gripped by pickup member 44 to the vicinity of another foreign material 4, then collectively grips foreign materials 4, carries foreign materials 4 to foreign material storage member 60, and discards foreign materials 4. In this manner, in foreign material removal device 40 having pickup member 44 that grasps and grips foreign material 4 by the opening and closing operation, foreign material 4 can be efficiently removed.

The present disclosure is not limited to the above-described embodiment at all, and can be implemented in various aspects as long as the embodiment belongs to the technical scope of the present disclosure.

Figure 18:
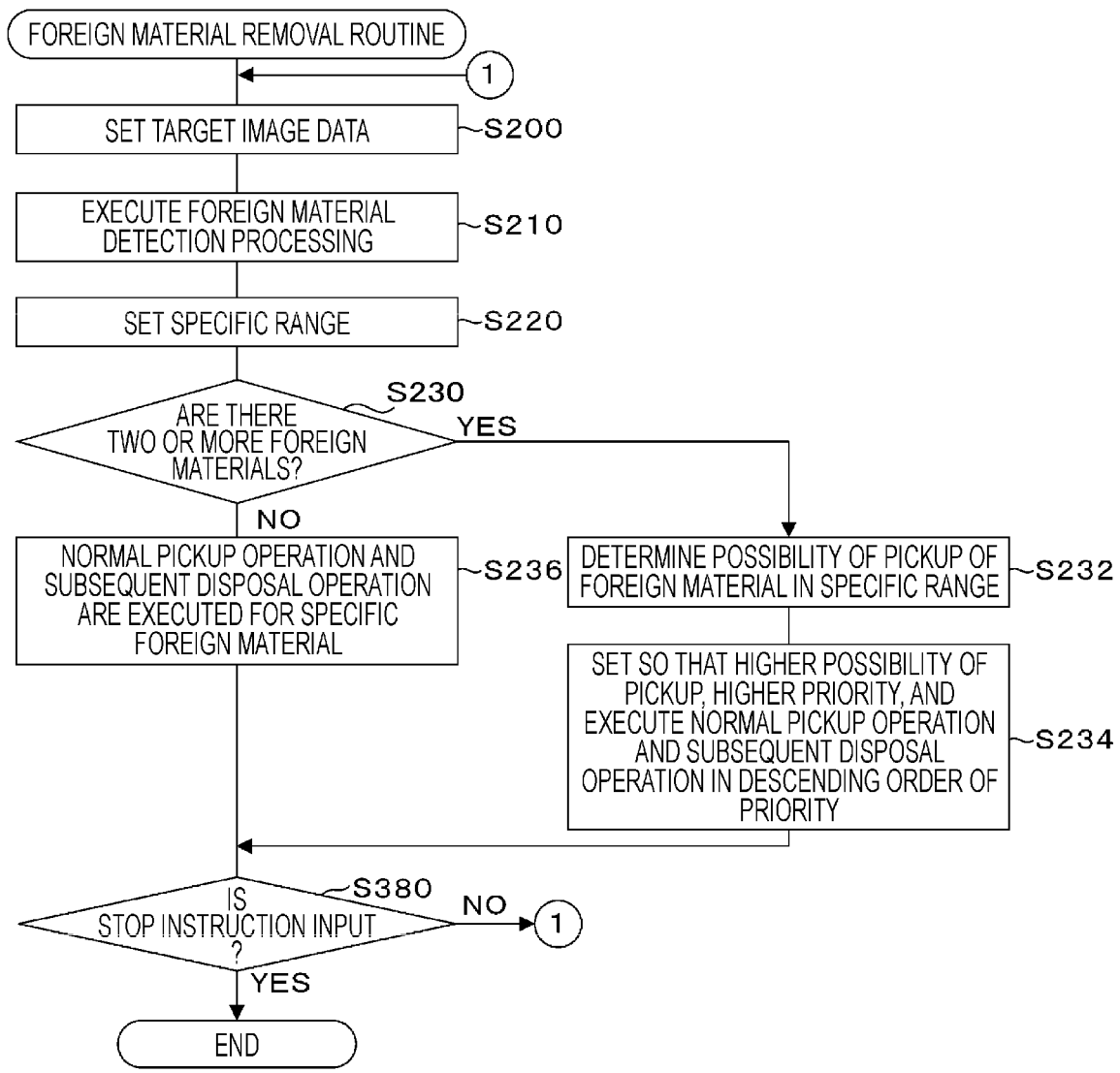
FIG. 18 is a flowchart illustrating a modification example of the foreign material removal routine.
Figure 19:
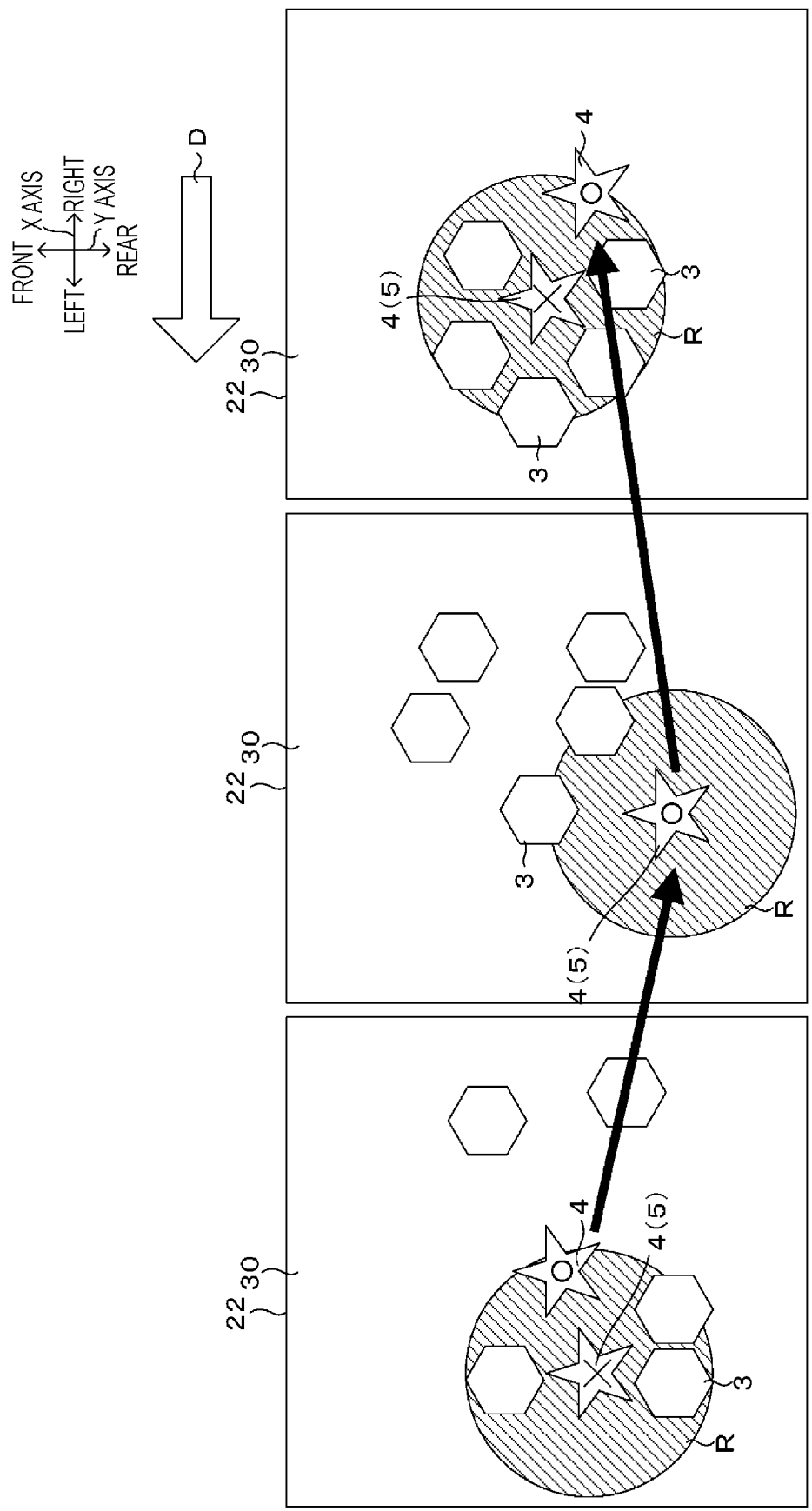
FIG. 19 is a diagram illustrating a method of determining a priority when foreign material 4 is picked up.

For example, in the above-described embodiment, CPU 51 determines whether foreign material 4 is picked up based on the possibility of pickup of foreign material 4; however, the configuration is not limited to this. For example, in the above-described embodiment, CPU 51 may execute a foreign material removal routine illustrated in FIG. 18. In this foreign material removal routine, after executing the processing of S200 to S230, when it is determined in S230 that there are two or more foreign materials 4 including specific foreign material 5 in specific range R, CPU 51 determines the possibility of pickup of each foreign material 4 in specific range R (S232). Subsequently, CPU 51 sets so that the higher the possibility of pickup, the higher the priority, and executes the normal pickup operation and the subsequent disposal operation in descending order of the priority (S234). For example, in a case where there are foreign material 4 with a "high" possibility of pickup and foreign material 4 with a "medium" possibility of pickup, the former is set to priority number 1 and the latter is set to priority number 2. Foreign material 4 having priority number 2 or later or foreign material 4 having the "low" possibility of pickup need not be picked up. On the other hand, when it is determined in S230 that there are no two or more foreign materials 4 in specific range R (that is, when it is determined that there is only specific foreign material 5), the normal pickup operation and the subsequent disposal operation are executed for specific foreign material 5 (S236). After S234 or S236, CPU 51 executes the processing of S380 described above. In this manner, since foreign material removal device 40 can pick up foreign material 4 in descending order of priority, the probability of successfully picking up foreign material 4 increases. Accordingly, foreign material 4 can be efficiently removed. FIG. 19 is a diagram illustrating a priority when foreign material 4 is picked up. In FIG. 19, recycling target object 3 is illustrated in a hexagonal shape, and foreign material 4 is illustrated in a starry shape. In addition, in specific range R, foreign material 4 having priority number 1 is marked with an o mark in a starry shape, and foreign material 4 having priority number 2 or later is marked with an x mark as not to be picked up. There are two foreign materials 4 in first specific range R (left diagram in FIG. 19), of which foreign material 4 indicated by an o mark is as a pickup target. In next specific range R (central diagram in FIG. 19), only one foreign material 4 exists, and thus foreign material 4 is set as a pickup target. There are two foreign materials 4 in next specific range R (right diagram in FIG. 19), of which foreign material 4 indicated by an o mark is set as a pickup target. In this manner, foreign materials 4 are set as the pickup targets in the order of black arrows.

Figure 20:
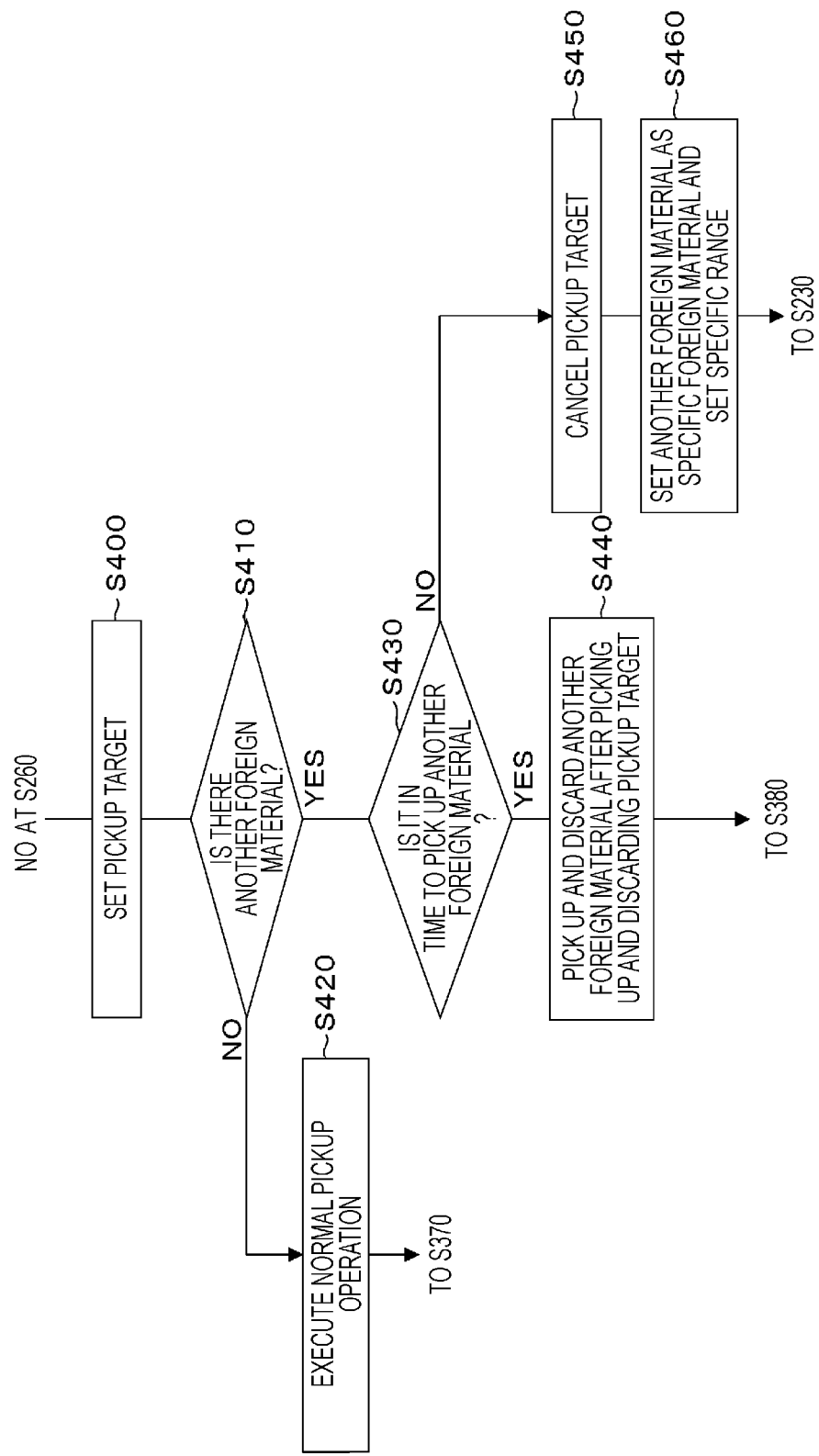
FIG. 20 is a flowchart illustrating a modification example of the foreign material removal routine.

In the above-described embodiment, when the negative determination is performed in S260, CPU 51 determines not to pick up foreign material 4 in specific range R; however, the configuration is not limited to this. For example, in a case where the negative determination is performed in S260, CPU 51 may predict whether it is in time to pick up another foreign material 4 outside specific range R, and may determine whether to execute an operation for removing foreign material 4 from waste material 2 based on the predicted result. FIG. 20 is a flowchart illustrating a modification example of the foreign material removal routine in this case. In the modification example of the foreign material removal routine, when the negative determination is performed in S260, CPU 51 sets a pickup target (S400). Specifically, CPU 51 sets any one of foreign materials 4 having the "low" possibility of pickup in specific range R as the pickup target. Subsequently, CPU 51 determines whether there is another foreign material 4 outside specific range R (S410). In S410, CPU 51 executes the same processing as that in S330. When a negative determination is performed in S410, CPU 51 executes a normal pickup operation for the pickup target (S420). The normal pickup operation is as described in S320 of the above-described embodiment. After S420, CPU 51 proceeds to S370. On the other hand, when an affirmative determination is performed in S410, CPU 51 predicts whether it is in time to pick up another foreign material 4 outside specific range R, after foreign material 4 set as the pickup target in S400 is carried to foreign material storage member 60 and discarded (S430). When it is predicted that it is in time, CPU 51 causes various members to pick up and discard another foreign material 4 (S440) after picking up and discarding the pickup target, and proceeds to S380. On the other hand, when it is predicted in S430 that it is not in time, since the possibility of pickup of foreign material 4 set as the pickup target in S400 is low, the pickup target is canceled (S450), the pickup of foreign material 4 is given up, another foreign material 4 is set as specific foreign material 5, and specific range R is set (S460), and then the process proceeds to S230. In this manner, it is possible to reduce the loss of pickup of foreign material 4 that can be picked up.

In the above-described embodiment, the exposed area of foreign material 4 is adopted as the feature of foreign material 4, and CPU 51 determines the possibility of pickup based on the exposed area of foreign material 4; however, the configuration is not limited to this. For example, the size and the shape of foreign material 4 may be adopted as the features of foreign material 4, and CPU 51 may determine the possibility of pickup based on the size and the shape.

In the above-described embodiment, CPU 51 determines the possibility of pickup based on ratio Q of height H2 of peripheral member 6 existing around foreign material 4 to height H1 of foreign material 4; however, the configuration is not limited to this. For example, CPU 51 may determine the possibility of pickup based on difference $\Delta H(H1-H2)$ between height H1 of foreign material 4 and height H2 of peripheral member 6 existing around foreign material 4. In this case, for example, when thresholds Ua (less than 0) and Ub (0 or more) are set in advance, and difference $\Delta H$ is less than Ua, the possibility of pickup may be determined to be "low", when difference $\Delta H$ is Ua or more and less than Ub, the possibility of pickup may be determined to be "medium", and when difference $\Delta H$ is Ub or more, the possibility of pickup may be determined to be "high". Thresholds Ua and Ub are set based on the size of the claw portions provided on pickup member 44, the interval between the claw portions, and the like.

In the above-described embodiment, CPU 51 determines the possibility of pickup in three stages of "low", "medium", and "high"; however, the configuration is not limited to this. For example, CPU 51 may determine the possibility of pickup in two stages of "low" and "high", or in four or more stages.

In the above-described embodiment, CPU 51 sets the weights of the determination result based on the feature of foreign material 4 and the determination result based on the surrounding situation of foreign material 4 to be equal to each other, and sets the possibility of pickup based on the feature of foreign material 4 and the surrounding situation of foreign material 4 based on the combination of both; however, the configuration is not limited to this. For example, CPU 51 may assign different weights to each of the determination result based on the feature of foreign material 4 and the determination result based on the surrounding situation of foreign material 4, and set the possibility of pickup based on the feature of foreign material 4 and the surrounding situation of foreign material 4 based on the combination of both. Specifically, when the first is "low" and the second is "medium", CPU 51 may determine that the possibility of pickup is higher when the determination result based on the feature of foreign material 4 is "medium" than when the determination result is not "medium".

In the above-described embodiment, foreign material removal device 40 is an XY robot; however, the configuration is not limited to this. For example, foreign material removal device 40 may be configured as an articulated robot.

In the above-described embodiment, foreign material detection device 15 is disposed upstream of height detection device 17 in conveyance direction D; however, the configuration is not limited to this. For example, height detection device 17 may be disposed upstream of foreign material detection device 15 in conveyance direction D.

In the above-described embodiment, after the simultaneous pickup operation is executed in S300 in the foreign material removal routine, CPU 51 proceeds to S370 and executes the disposal operation of foreign material 4; however, the configuration is not limited to this. For example, CPU 51 may proceed to S330 after executing a simultaneous gripping operation. In this case, when the process proceeds to S360 through S340, S350, and S352, in S360, CPU 51 may cause various members to drop two or more foreign materials 4 picked up by pickup member 44 to the vicinity of another foreign material 4, collectively pick up the dropped two or more foreign materials 4 and another foreign material 4, and discard the dropped two or more foreign materials 4 and another foreign material 4 in foreign material storage member 60.

In the above-described embodiment, CPU 51 determines whether there is another foreign material 4 outside specific range R after picking up foreign material 4 in S320, and determines whether the possibility of pickup of another foreign material 4 is high, when it is determined that there is another foreign material 4; however, the configuration is not limited to this. For example, CPU 51 may determine whether there is another foreign material 4 outside specific range R before picking up foreign material 4, or may determine whether the possibility of pickup of another foreign material 4 is high.

In FIG. 7 of the above-described embodiment, when the negative determination is performed in S230, CPU 51 may determine the possibility of pickup of specific foreign material 5, proceed to S240 when the possibility of pickup is high (for example, "high" or "medium"), and skip to S380 as not to pick up specific foreign material 5 when the possibility of pickup is low ("low").

In the above-described embodiment, after it is determined in S350 that the possibility of pickup of another foreign material 4 is high, the process proceeds to S352, and it is determined whether the pickup of another foreign material 4 is in time. When the negative determination is performed, the process proceeds to S360, and the operation of dropping picked-up foreign material 4 to the vicinity of another foreign material 4 is executed; however, the present configuration is not limited to this. For example, after it is determined in S350 that the possibility of pickup of another foreign material 4 is high, the process may proceed to S360, and picked-up foreign material 4 may be dropped to the vicinity of another foreign material 4.

In the above-described embodiment, foreign material removal system 10 includes height detection device 17; however, the configuration is not limited to this. In the above-described embodiment, foreign material removal system 10 need not include height detection device 17. In this case, CPU 51 may determine the possibility of pickup based on the feature of foreign material 4 detected in S210.

INDUSTRIAL APPLICABILITY

The present disclosure can be used for recycling and the like of industrial waste.

REFERENCE SIGNS LIST

1: Recycling system, 2: Waste material, 3: Recycling target object, 4: Foreign material, 5: Specific foreign material, 6: Peripheral member, 10: Foreign material removal system, 11a: First crusher, 11b: Second crusher, 12a: First magnetic separator, 12b: Second magnetic separator, 13: Screen machine, 15: Foreign material detection device, 16: Holding member, 17: Height detection device, 18: Holding member, 20: Conveyance device, 21: Conveyance device, 22: Conveyance device, 23: Conveyance device, 24: Conveyance device, 25: Conveyance device, 30: Conveyance surface, 40: Foreign material removal device, 41: X-axis slider, 42: Y-axis slider, 43: Lifting and lowering device, 44: Pickup member, 45: Pickup member drive section, 46: Guide rail, 47: Rail installing section, 48: Guide rail, 49: Storage box, 50: Control device, 51: CPU, 52: ROM, 53: RAM, 54: Storage, 60: Foreign material storage member.

The invention claimed is:

1. A foreign material removal system comprising:
a conveyance device configured to convey a waste material in a conveyance direction, a target object and a foreign material being mixed in the waste material;
a foreign material detection device configured to detect the foreign material contained in the waste material; and
a foreign material removal device provided downstream of the foreign material detection device in the conveyance direction, the foreign material removal device includes a gripping portion including claws configured to pick up the foreign material detected by the foreign material detection device, carry the foreign material to a predetermined disposal place, and discard the foreign material,
wherein when two or more foreign material pieces exist in a specific range in which the two or more foreign material pieces can be collectively gripped by one opening and closing operation of the claws, the foreign material removal device is configured to
determine a possibility of pickup of the foreign material based on at least one of a feature or a surrounding situation of the foreign material detected by the foreign material detection device, and
determine whether to pick up the foreign material or determine a priority of picking up the foreign material, based on the possibility of pickup.

2. The foreign material removal system according to claim 1, wherein
in a case where it is determined that the possibility of pickup of the foreign material is low the foreign material removal device does not pick up the foreign material.

3. The foreign material removal system according to claim 1, wherein
the foreign material removal device determines a possibility of gripping the foreign material by the gripping portion based on at least one of the feature or the surrounding situation of the foreign material detected by the foreign material detection device when determining a possibility of pickup of the foreign material.

4. The foreign material removal system according to claim 3, wherein
an exposed area of the foreign material detected by the foreign material detection device is used as the feature of the foreign material, and a height of a member existing around the foreign material with respect to a height of the foreign material detected by the foreign material detection device is used as the surrounding situation of the foreign material.

5. The foreign material removal system according to claim 4, wherein
the foreign material removal device determines that the possibility of pickup is lower as the exposed area of the foreign material is smaller, and determines that the possibility of pickup is lower as the height of the member existing around the foreign material with respect to the height of the foreign material is higher.

6. A foreign material removal system comprising:
a conveyance device configured to convey a waste material in a conveyance direction, a target object and a foreign material being mixed in the waste material;
a foreign material detection device configured to detect the foreign material contained in the waste material; and
a foreign material removal device provided downstream of the foreign material detection device in the conveyance direction, and the foreign material removal device includes a gripping portion including claws configured to pick up the foreign material detected by the foreign material detection device, carry the foreign material to a disposal place, and discard the foreign material,
wherein the foreign material removal device is configured to collectively pick up two or more foreign material pieces which exist within a specific range by one opening and closing operation of the claws, carry the foreign material pieces to the disposal place, and discard the foreign material pieces.

7. The foreign material removal system according to claim 6, wherein
when it is predicted that there is not time to execute an operation of individually picking up the two or more foreign material pieces, carrying the foreign material pieces to the disposal place, and discarding the foreign material pieces, the foreign material removal device collectively picks up the foreign material pieces, carries the foreign material pieces to the disposal place, and discards the foreign material pieces.

8. The foreign material removal system according to claim 6, wherein
the foreign material removal device includes a gripping portion configured to grasp and grip the foreign material by an opening and closing operation, and the foreign material removal device collectively grips two or more foreign material pieces by one opening and closing operation of the gripping portion, carries the foreign material pieces to the disposal place, and discards the foreign material pieces, when the two or more foreign material pieces exist in a specific range in which the two or more foreign material pieces can be collectively gripped by one opening and closing operation.

9. The foreign material removal system according to claim 6, wherein
the foreign material removal device drops a foreign material piece gripped by the gripping portion within a specific range of a foreign material piece different from the gripped foreign material piece, and then collectively grips the foreign material pieces, carries the foreign material pieces to the disposal place, and discards the foreign material pieces.

\* \* \* \* \*